(12) United States Patent
Nomura et al.

(10) Patent No.: US 10,170,897 B2
(45) Date of Patent: Jan. 1, 2019

(54) WIRE HARNESS EQUIPPED WITH PROTECTOR

(71) Applicant: SUMITOMO WIRING SYSTEMS, LTD., Yokkaichi-shi, Mie (JP)

(72) Inventors: Yuki Nomura, Yokkaichi (JP); Hiroaki Sakamoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 15/762,219

(22) PCT Filed: Oct. 5, 2016

(86) PCT No.: PCT/JP2016/079581
§ 371 (c)(1),
(2) Date: Mar. 22, 2018

(87) PCT Pub. No.: WO2017/061452
PCT Pub. Date: Apr. 13, 2017

(65) Prior Publication Data
US 2018/0287355 A1    Oct. 4, 2018

(30) Foreign Application Priority Data

Oct. 7, 2015  (JP) ................................ 2015-199378
Sep. 23, 2016 (JP) ................................ 2016-185333

(51) Int. Cl.
| | | |
|---|---|---|
| *H02G 3/04* | (2006.01) | |
| *B60R 16/02* | (2006.01) | |
| *H01B 7/00* | (2006.01) | |

(52) U.S. Cl.
CPC ....... *H02G 3/0437* (2013.01); *B60R 16/0215* (2013.01); *H02G 3/0418* (2013.01); *H01B 7/0045* (2013.01)

(58) Field of Classification Search
CPC ...... H02G 3/0437; H02G 3/04; H02G 3/0418; H01B 7/0045; H05K 5/0217; H05K 5/0247; B60R 16/0215
See application file for complete search history.

(56) References Cited

U.S. PATENT DOCUMENTS

| | | | |
|---|---|---|---|
| 6,294,736 B1 * | 9/2001 | Takeda ..................... | H02G 3/30 174/72 A |
| 2005/0108858 A1 * | 5/2005 | Daito ....................... | H02G 3/32 24/16 PB |

(Continued)

FOREIGN PATENT DOCUMENTS

JP    2009165287 A    7/2009

OTHER PUBLICATIONS

International Search Report for Application No. PCT/JP2016/079581 dated Nov. 1, 2016; 5 pages.

*Primary Examiner* — Hoa C Nguyen
*Assistant Examiner* — Amol Patel
(74) *Attorney, Agent, or Firm* — Reising Ethington, P.C.

(57) ABSTRACT

A protector-equipped wire harness includes: an electrical wire; a protector that includes a pair of side walls that protrude from a bottom, a slide supporting portion that is formed so as to extend in a first direction X, and a receiver that is provided on a bottom side of the slide supporting portion, and in which the electrical wire can be disposed in a groove that is defined by the bottom and the pair of side walls; and an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire.

9 Claims, 16 Drawing Sheets

(56) References Cited

U.S. PATENT DOCUMENTS

2012/0298404 A1* 11/2012 Tokunaga ........... B60R 16/0215
                                                    174/135
2014/0060923 A1*  3/2014 Takaya ................ B60R 16/0215
                                                    174/72 A
2015/0294768 A1* 10/2015 Sakaki ................ B60R 16/0207
                                                    174/68.3

* cited by examiner

WIRE HARNESS EQUIPPED WITH PROTECTOR

CROSS REFERENCE TO RELATED APPLICATIONS

This application claims the priority of Japanese patent application JP2015-199378 filed on Oct. 7, 2015 and JP2016-185333 filed on Sep. 23, 2016, the entire contents of both applications are incorporated herein by reference.

TECHNICAL FIELD

The present invention relates to a protector for protecting an electrical wire, and a protector-equipped wire harness that includes an attachment member for attaching an electrical wire to a protector.

BACKGROUND ART

Patent Document 1 (JPH09-121422A) discloses a protector and a clamp for fixing electrical wires to the protector. According to Patent Document 1, the clamp includes a band that is wound around electrical wires, and a lock portion that fixes the electrical wires tied together by the band, to the protector. The protector is provided with a lock hole that can be locked to the lock portion of the clamp.

SUMMARY

However, the lock hole according to Patent Document 1 is a through hole that penetrates through a surface of the protector. Therefore, when the lock portion is inserted into the lock hole, the lock portion of the clamp protrudes outward from the lock hole of the protector by a large length. In this case, there is concern that the lock portion of the clamp, which protrudes from the protector by a large length in a state of being mounted on a vehicle, will come into contact with members around the lock portion, and that an area in which the protector can be disposed is limited.

Therefore, the present design aims to prevent a portion of the protector to which an electrical wire is fixed from protruding outward from the outer surface of the protector by a large length.

To solve the above-describe problem, a protector-equipped wire harness according to a first aspect is a protector-equipped wire harness that includes: an electrical wire; a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire, wherein the protector and the attachment member are fixed to each other in a state where the band lock portion of the attachment member is in contact with the receiver.

A second aspect is the protector-equipped wire harness according to the first aspect, wherein the protector includes a retaining protrusion that is locked to the band lock portion from a side to prevent the slidable portion from coming loose from the slide supporting portion in a state where the band lock portion is in contact with the receiver.

A third aspect is the protector-equipped wire harness according to the first or the second aspect, wherein the slide supporting portion includes at least one of a pair of edge portions that are located opposite to each other with respect to a slit that extends in the first direction, the slidable portion is supported so as to be slidable in the first direction relative to at least one of the pair of edge portions, and the protector-equipped wire harness further includes a coupling portion that couples the pair of edge portions, which are located opposite to each other with respect to the slit, to each other at a position that is away from a trajectory of the slidable portion sliding on the slide supporting portion.

A fourth aspect is the protector-equipped wire harness according to the third aspect, wherein the band lock portion is provided with a lock protrusion that is locked to the coupling portion from a side to prevent the slidable portion from coming loose from the slide supporting portion in a state where the band lock portion is in contact with the receiver.

A fifth aspect is the protector-equipped wire harness according to any one of the first to fourth aspects, wherein the slide supporting portion includes at least one of a pair of edge portions that are located opposite to each other with respect to a slit that extends in the first direction, and the slidable portion constitutes a recessed groove that is recessed so as to allow one of the pair of edge portions to pass therethrough, and includes at least one of a pair of slidable side walls that are provided on both sides of the recessed groove.

A sixth aspect is the protector-equipped wire harness according to the fifth aspect, wherein the pair of slidable side walls of the slidable portion are formed such that base end-side portions of the slidable side walls are thinner than leading end-side portions of the slidable side walls.

A seventh aspect is the protector-equipped wire harness according to any one of the first to sixth aspects, wherein the protector includes a bottom and a pair of side walls that protrude from the bottom, at least one of the pair of side walls serves as the plate-shaped portion on which the slide supporting portion is provided so as to extend in the first direction from a leading end-side portion of the side wall toward the side wall, and the electrical wire is disposed in a groove that is defined by the bottom and the pair of side walls.

An eighth aspect is the protector-equipped wire harness according to the seventh aspect, wherein the protector further includes a lid that covers the groove from a side that is opposite to the bottom side with respect to the groove, and the lid includes a gripping portion that sandwiches the pair of edge portions from an inner surface side and an outer surface side of a side wall.

A ninth aspect is the protector-equipped wire harness according to any one of the first to eighth aspects, wherein a portion of the plate-shaped portion, on which the slide supporting portion is provided, protrudes more outward compared to portions on both sides of the portion on which the slide supporting portion is provided.

A tenth aspect is the protector-equipped wire harness according to any one of the first to ninth aspects, wherein one end of the band is formed continuous with the band lock portion, the band is kept in a state of being wound around the electrical wire such that the band penetrates through the band lock portion and the other end of the band protrudes from the band lock portion, and the protector includes a cover that covers at least a portion of a portion around the other end of the band such that the other end of the band protrudes in the first direction.

According to the first aspect, regarding the slidable portion of the attachment member, the slide supporting portion formed on the plate-shaped portion of the protector allows the slidable portion of the attachment member to slide in the first direction so that the band lock portion comes into contact with the receiver, and thus the protector and the attachment member are fixed to each other. In this case, there is no need to use a conventional clamp or the like to fix the protector and the attachment member to each other. Therefore, it is possible to prevent a portion of the protector to which the electrical wire is fixed from protruding outward from the outer surface of the protector by a large length.

According to the second aspect, the protector is provided with the retaining portion. Therefore, it is possible to prevent the slidable portion from moving in a direction that is opposite to the first direction, and coming loose from the slide supporting portion. Thus, it is possible to prevent the protector and the attachment member from being released from a state of being fixed to each other.

According to the third aspect, the pair of edge portions, which are located opposite to each other with respect to the slit, are coupled to each other by the coupling portion. Therefore, the pair of edge portions are less likely to move away from each other, and the slidable portion is less likely to come loose from the slide supporting portion.

According to the fourth aspect, the band lock portion is provided with the lock protrusion that is locked to the coupling portion. Therefore, it is possible to prevent the slidable portion from moving in a direction that is opposite to the first direction and coming loose from the slide supporting portion. Thus, it is possible to prevent the protector and the attachment member from being released from a state of being fixed to each other.

According to the fifth aspect, the slide supporting portion includes at least one of a pair of edge portions that are located opposite to each other with respect to the slit that extends in the first direction, and the slidable portion includes a recessed groove that is recessed so as to allow at least one of the pair of edge portions to pass therethrough. In this case, it is possible to fix the protector and the attachment member to each other using the slide supporting portion and the slidable portion, which have a simple configuration including the slit that is formed in the plate-shaped portion and the recessed groove that is recessed so as to allow at least one of the pair of edge portions that are located opposite to each other with respect to the slit to pass therethrough.

According to the sixth aspect, the slidable portion includes a pair of slidable side walls that define a recessed groove. Also, the slidable side walls are formed such that base end-side portions of the slidable side walls are thinner than leading end-side portions of the slidable side walls. Thus, the recessed groove is formed such that the width of a base end-side portion of the recessed groove with respect to the base ends of the slidable side walls is larger than the width of a leading end-side portion of the recessed groove with respect to the leading ends of the slidable side walls. In this case, when the slide supporting portion allows the slidable portion to be moved in the first direction, the recessed groove is likely to deform such that the width of the leading end-side portion thereof increases.

According to the seventh aspect, the electrical wire is disposed in the groove that is defined by the bottom and the pair of side walls. Therefore, it is possible to sufficiently protect the electrical wire. Also, the protector includes the lid, and the lid includes the gripping portion that sandwiches the pair of edge portions from the inner surface side and the outer surface side of the side wall. That is, the gripping portion grips portions near the pair of edge portions, which are portions on both sides of the slit in the side wall, and thus the gripping portion prevents the portions near the pair of edge portions from deforming.

According to the eighth aspect, the protector includes a lid, and the lid includes the gripping portion that sandwiches the pair of edge portions from the inner surface side and the outer surface side of the side wall. That is, the gripping portion grips portions near the pair of edge portions, which are portions on both sides of the slit in the side wall, and thus the gripping portion prevents the portions near the pair of edge portions from deforming.

According to the ninth aspect, a portion of the plate-shaped portion, on which the slide supporting portion is provided, protrudes more outward compared to portions of the plate-shaped portion other than the portion on which the slide supporting portion is provided. In this case, it is possible to reduce the width of the portions other than the portion of the protector on which the slide supporting portion is provided, and it is possible to reduce the space required for the protector-equipped wire harness.

According to the tenth aspect, the protector includes a cover that covers the other end of the band. Therefore, it is possible to prevent the other end of the band from coming into contact with members around the protector-equipped wire harness.

DESCRIPTION OF EMBODIMENTS

Figure 1:
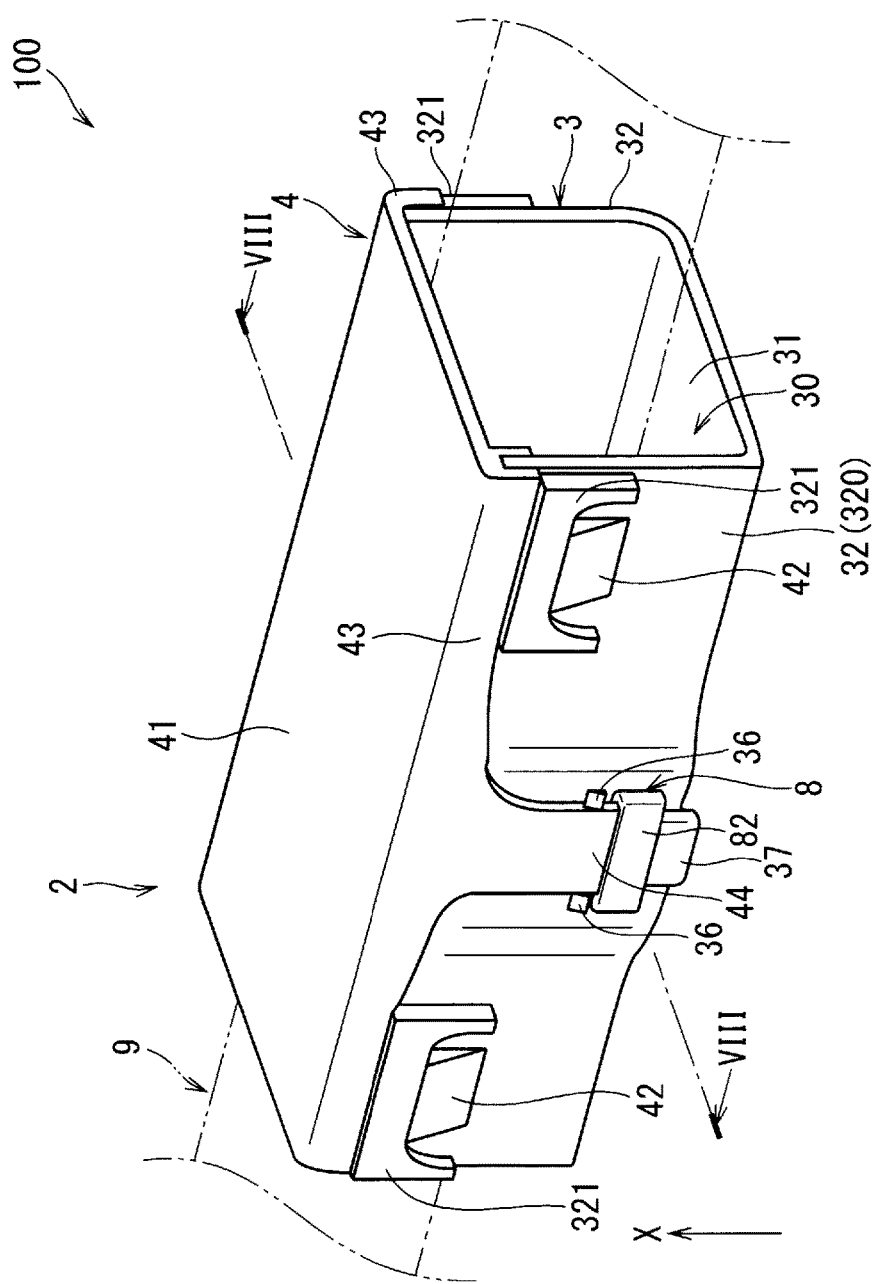
FIG. 1 is a perspective view of a protector-equipped wire harness according to a first embodiment.

The following describes embodiments with reference to the accompanying drawings. The following embodiments are specific examples of the present design, and are not intended to limit the technical scope of the present invention.

First Embodiment

First, a protector-equipped wire harness 100 according to a first embodiment will be described with reference to FIGS. 1 to 8. The protector-equipped wire harness 100 includes an electrical wire 9, a protector 2, and an attachment member 8. In this example, the protector 2 includes a protector body 3 and a lid 4. Note that the protector body 3 includes a bottom 31 and a pair of side walls 32 that protrude from the bottom 31, and the bottom 31 and the pair of side walls 32 form a groove 30 in which the electrical wire 9 can be disposed. One of the pair of side walls 32 is an example of a plate-shaped portion of the protector 2. The lid 4 is a portion that covers the groove 30 from the side that is opposite to the bottom 31 with respect to the groove 30.

Figure 2:
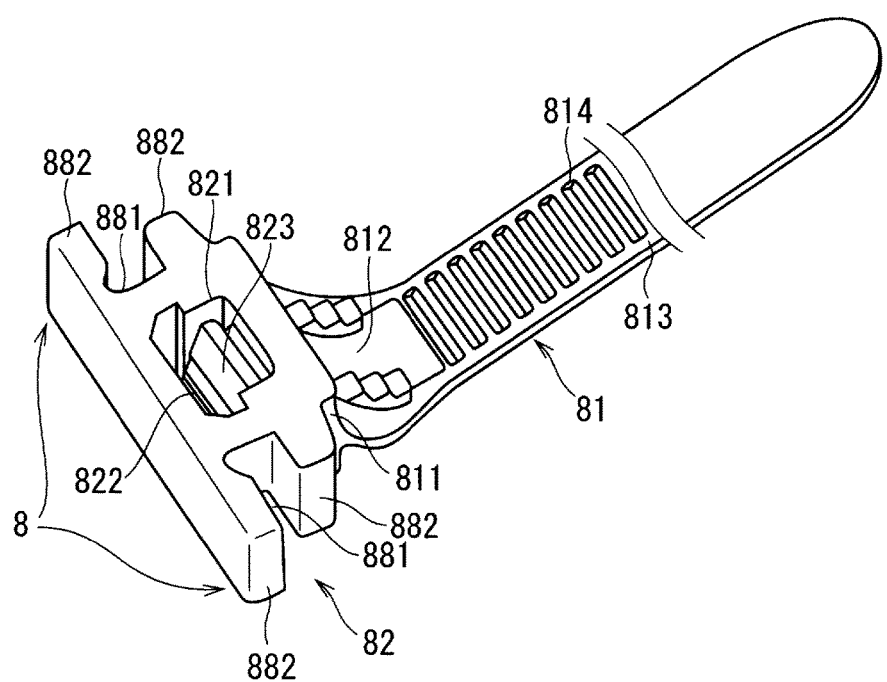
FIG. 2 is a perspective view of an attachment member of the protector-equipped wire harness according to the first embodiment.
Figure 3:
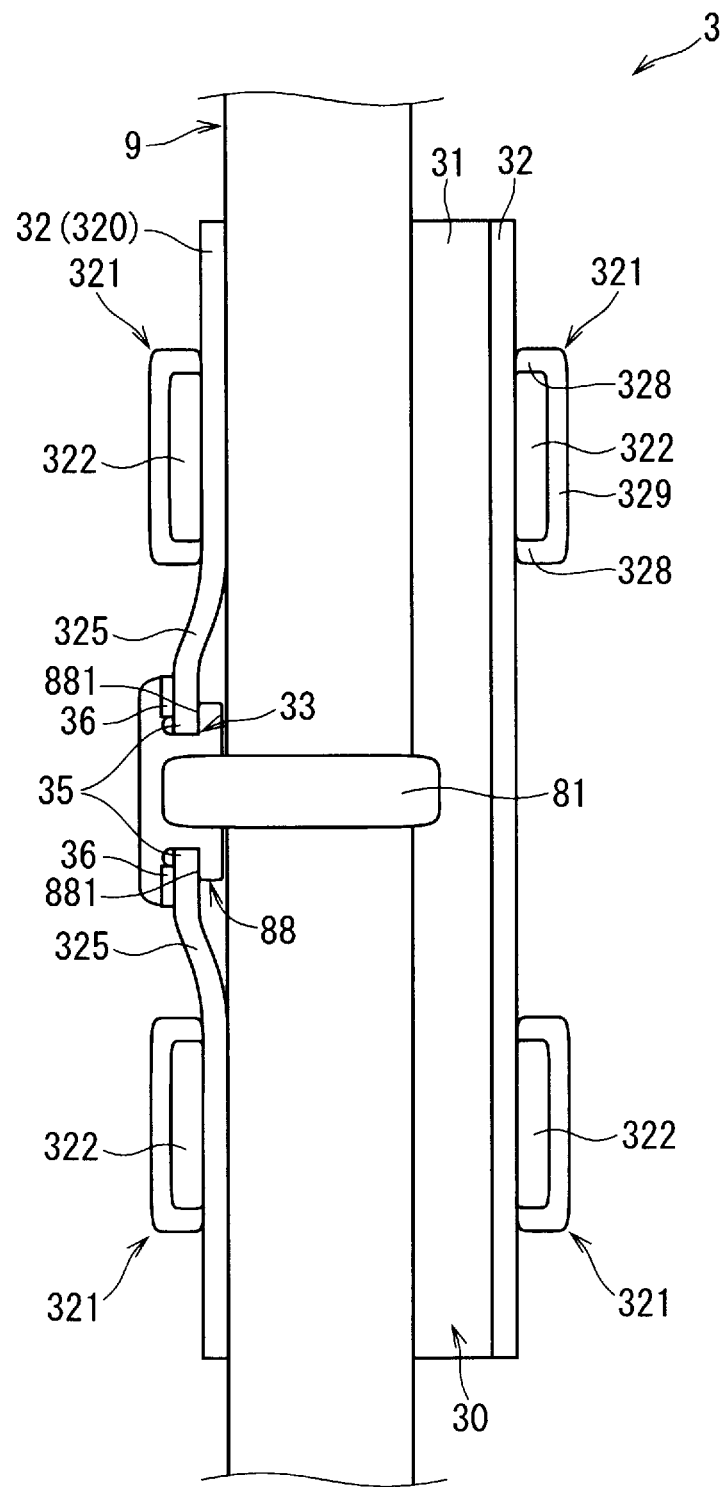
FIG. 3 is a plan view of a portion of a protector of the protector-equipped wire harness according to the first embodiment and an electrical wire.
Figure 4:
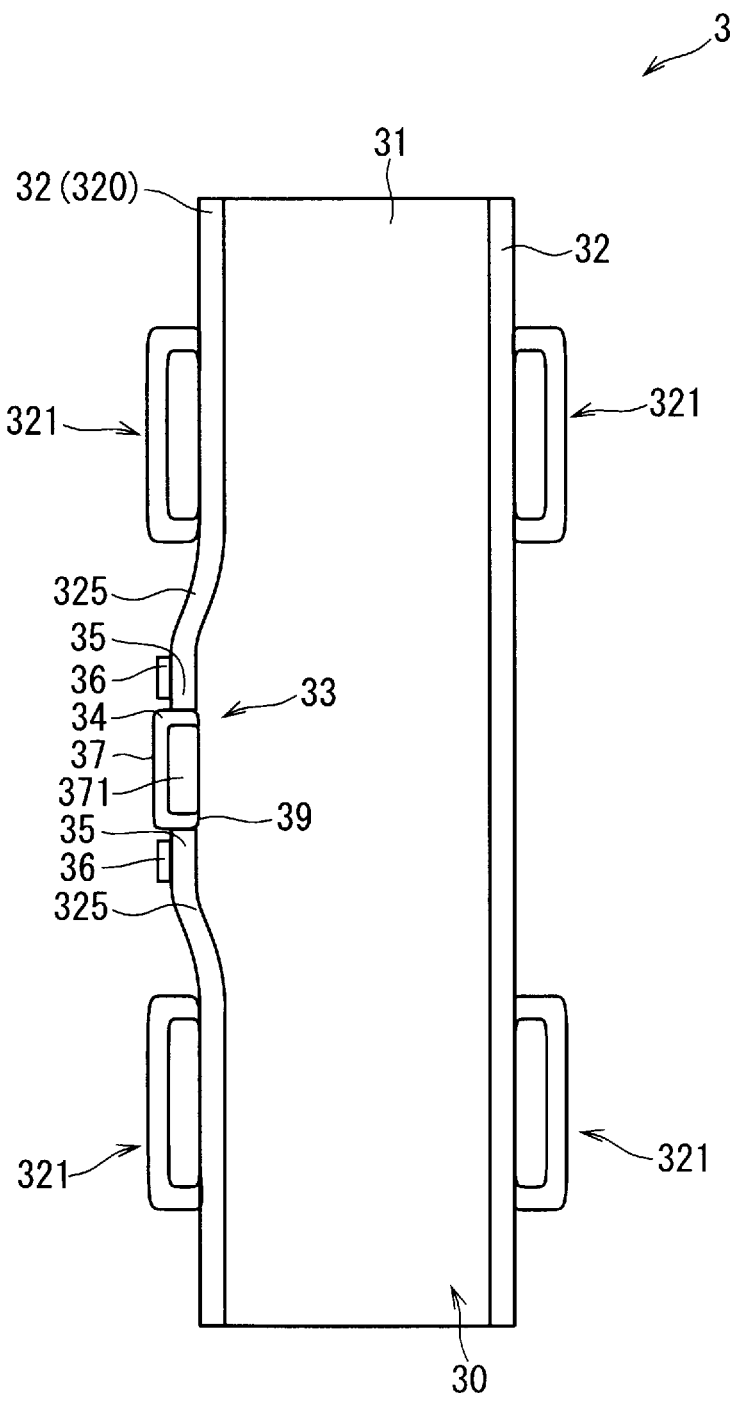
FIG. 4 is a plan view of a portion of the protector of the protector-equipped wire harness according to the first embodiment.
Figure 5:
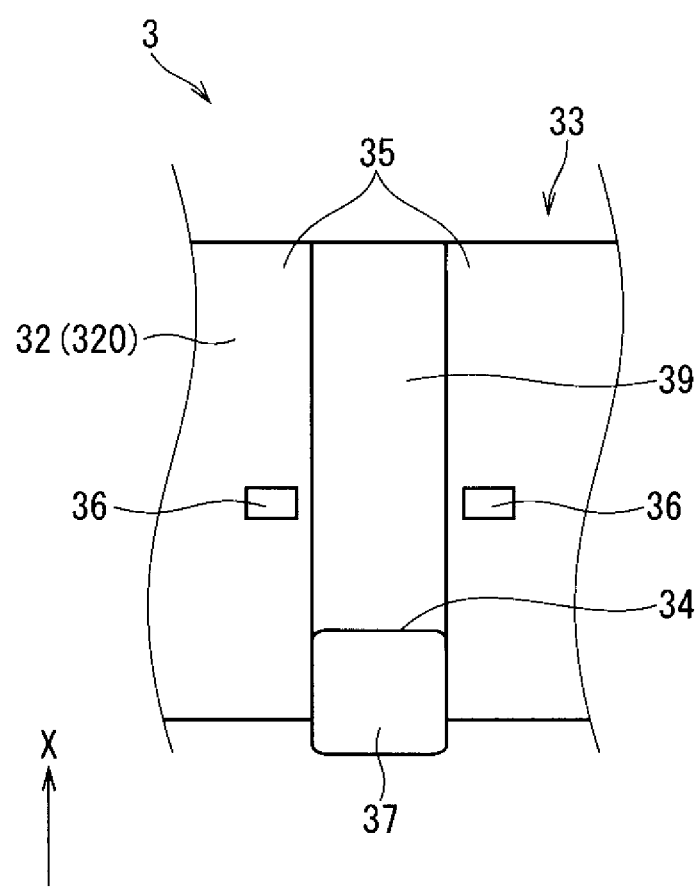
FIG. 5 is a side view of a portion of the protector of the protector-equipped wire harness according to the first embodiment.
Figure 6:
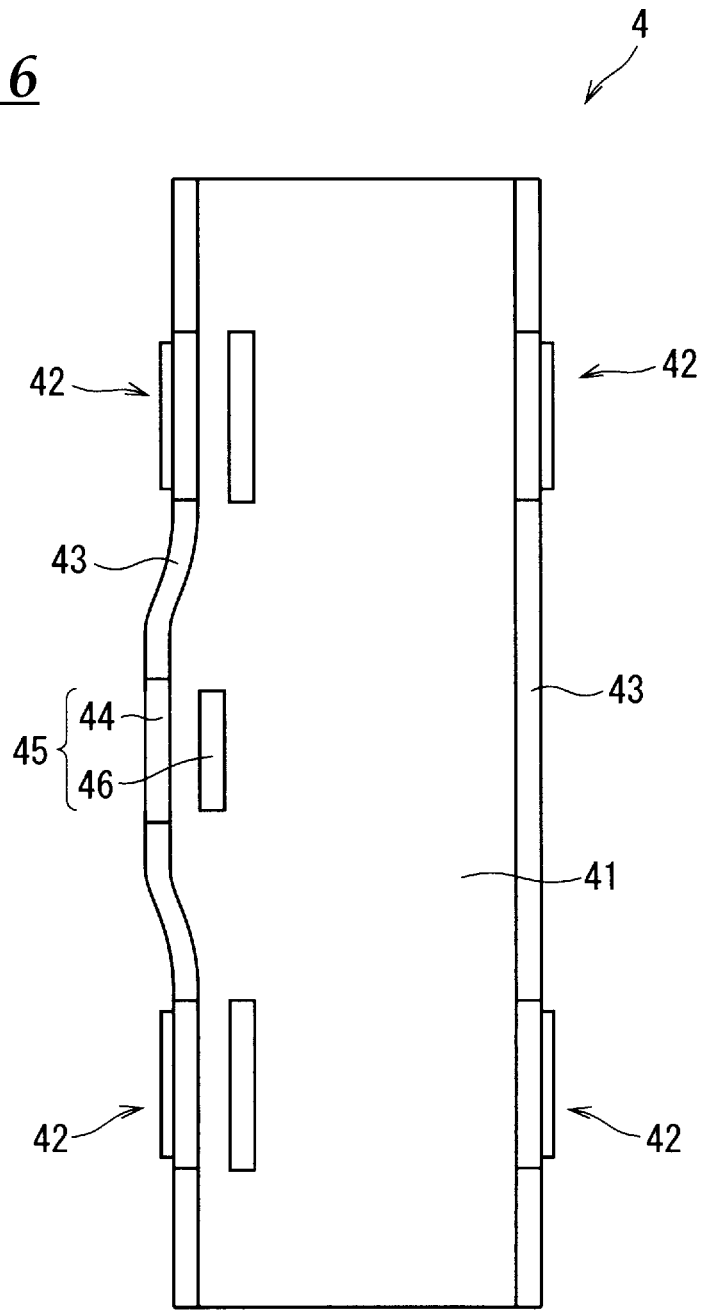
FIG. 6 is a plan view of a portion of the protector of the protector-equipped wire harness according to the first embodiment.
Figure 7:
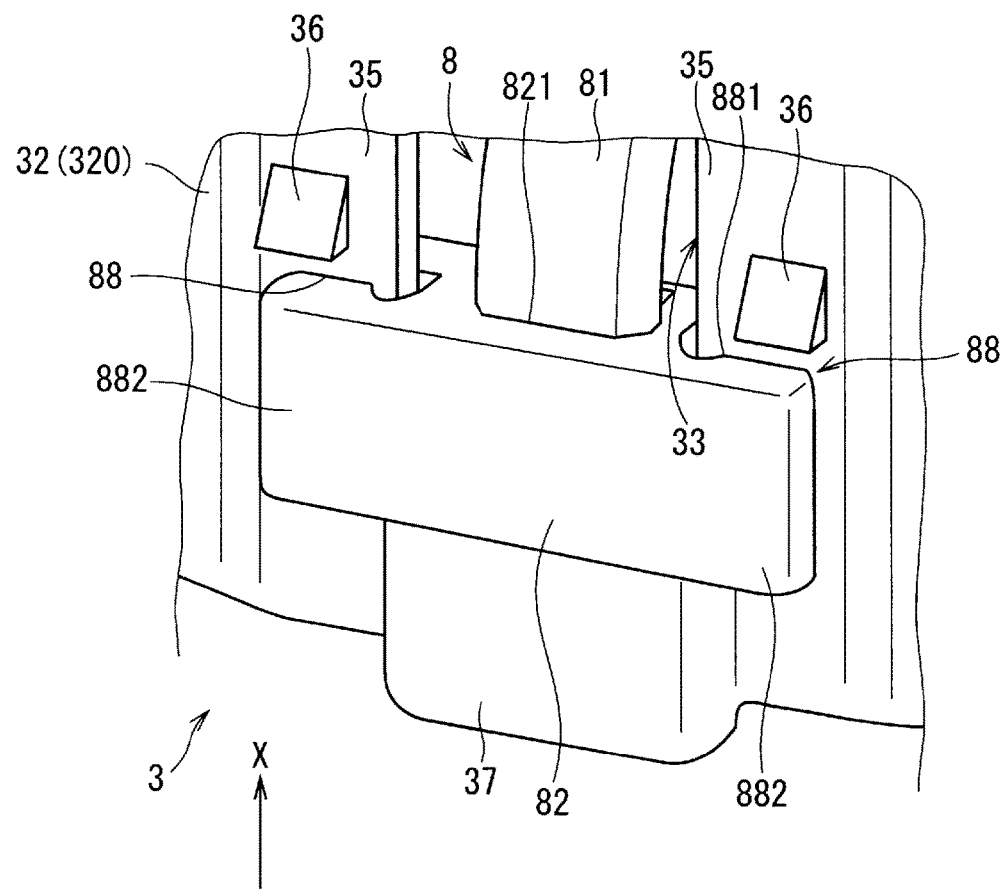
FIG. 7 is a partially enlarged perspective view of the protector-equipped wire harness according to a first embodiment.
Figure 8:
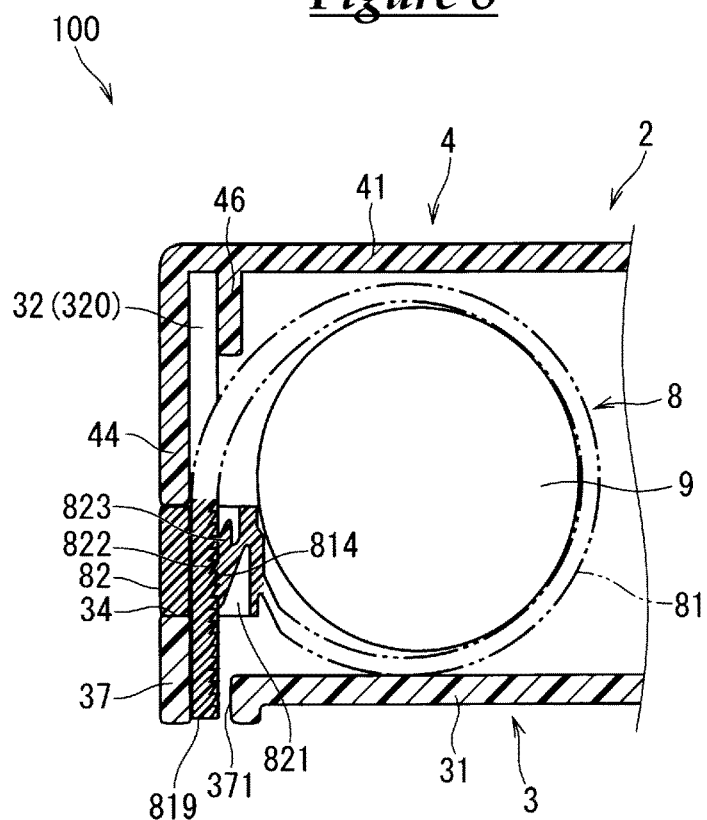
FIG. 8 is a cross-sectional view of the protector-equipped wire harness according to the first embodiment.

FIG. 1 is a perspective view of the protector-equipped wire harness 100. In FIG. 1, the electrical wire 9 is indicated by imaginary lines (two-dot chain lines). FIG. 2 is a perspective view of the attachment member 8. FIG. 3 is a plan view of a portion of the protector 2, and is specifically a plan view of the protector body 3 in which the electrical wire 9 is disposed. FIG. 4 is a plan view of a portion of the protector 2, and is specifically a plan view of the protector body 3. FIG. 5 is a side view of a portion of the protector 2, and is specifically a side view of the protector body 3. FIG. 6 is a plan view of a portion of the protector 2, and is specifically a plan view of the lid 4. Note that FIG. 6 shows the back side of the lid 4 (the bottom 31 side when the lid 4 is attached to the protector body 3). FIG. 7 is a partially enlarged view of the protector-equipped wire harness 100 in FIG. 1, and is specifically a partially enlarge perspective view in which a portion of the protector 2 and a portion of the attachment member 8 in a state where the protector 2 and the attachment member 8 are fixed are enlarged. FIG. 8 is a cross-sectional view of the protector-equipped wire harness 100. Note that FIG. 8 is a cross-sectional view along a line VIII-VIII in FIG. 1.

First, the attachment member 8 will be described. In the present embodiment, as shown in FIG. 2 and so on, the attachment member 8 includes: a band 81 that can be wound around the electrical wire 9; and a band lock portion 82 that includes slidable portions 88 that are supported by a slide supporting portion 33 so as to be slidable in a first direction X, and keeps the band 81 in a state of being wound around the electrical wire 9. The attachment member 8 is a member that is made of resin, for example.

In the attachment member 8, the band 81 is configured to be wound around one or more electrical wires 9. In this example, the electrical wire 9 may be an insulated electrical wire that includes a core that is mainly made of metal such as copper or aluminum, and an insulating coating that covers the core. If the electrical wire 9 is provided as a plurality of electrical wires 9, the band 81 is wound around the plurality of electrical wire 9 all at once.

In this example, as shown in FIG. 2, the band 81 has a narrow band shape. Also, in this example, the band lock portion 82 is formed continuously with a proximal end 811 of the band 81. That is, in the present embodiment, the attachment member 8 includes the band 81 and the band lock portion 82 that are integrated into one piece. Note that, in another mode, an attachment member may include a band and a band lock portion that are separate members.

The following describes the details of the band 81. In this example, as shown in FIG. 2, the band 81 includes a base end portion 812 that is formed at the proximal end 811 of the band 81, an elongated portion 813 that is wound around the electrical wire 9, and lock recesses 814.

In this example, the base end portion 812 is provided at the proximal end 811 of the band 81, and is a relatively flexible portion that is deformable from a coupling portion thereof that is coupled to the band lock portion 82, to allow the band 81 to wrap around the electrical wire 9. The base end portion 812 makes it easier to wind the band 81 around the electrical wire 9.

Also, in this example, the elongated portion 813 has a flat shape. The elongated portion 813 has a length with which the elongated portion 813 can be wound around the electrical wire 9. A central area of the elongated portion 813 is recessed, and the lock recesses 814 are provided in the recessed portion of the elongated portion 813.

As shown in FIG. 2, the plurality of lock recesses 814 are formed on one main surface of the elongated portion 813 of the band 81 so as be arranged one after another in the lengthwise direction of the band 81. Note that the aforementioned one main surface of the elongated portion 813 of the band 81 is a main surface that faces toward the electrical wire 9 when the band 81 is wound around the electrical wire 9.

Next, the following describes the band lock portion 82. The band lock portion 82 is a portion that keeps the band 81 in a state of being wound around the electrical wire 9. In this example, as shown in FIGS. 2 and 8, the band lock portion 82 is provided with a through hole 821 that allows the band 81 to pass therethrough. The band lock portion 82 includes: a lock claw 823 that is provided inside the through hole 821 and includes lock protrusions 822 that can be locked to the lock recesses 814 of the band 81; and the slidable portions 88.

The following describes the details of the band lock portion 82. The through hole 821 is a hole that penetrates through the band lock portion 82 from one surface thereof to the other surface on the opposite side. In this example, the band 81 is passed through the through hole 821 from the aforementioned one surface of the band lock portion 82 to the aforementioned other surface of the band lock portion 82.

As shown in FIGS. 2 and 8, the lock claw 823 is formed continuously with a hinge-side inner wall surface portion of the inner wall surface that defines the through hole 821, the hinge-side inner wall surface being located on a continuous portion side, the continuous portion being continuous with the base end portion 812 of the band 81. In this example, as shown in FIG. 8, the lock claw 823 is continuous with the hinge-side inner wall surface at a base-side portion, and is formed so as to protrude toward the aforementioned other surface of the band lock portion 82. In a natural state, a gap is formed between the lock claw 823 and the hinge-side inner wall surface. That is, in a natural state, the leading end portion of the lock claw 823 is separated from the hinge-side inner wall surface, and is inclined toward the opposite inner wall surface that faces toward the hinge-side inner wall surface. The leading end portion of the lock claw 823 is configured to elastically deform to narrow the gap between the leading end portion and the hinge-side inner wall surface.

The lock protrusions 822 formed on the lock claw 823 are portions that can be selectively locked to the plurality of lock recesses 814 of the band 81. In this example, as shown in FIG. 8, three lock protrusions 822 are formed on the lock claw 823. However, as a matter of course, the number of lock protrusions 822 formed on the lock claw 823 may be one, two, four, or more.

In this example, the band 81 is wound around the electrical wire 9, and the band 81 is inserted into the through hole 821 of the band lock portion 82 from an end of the band 81, the end being opposite to the proximal end 811. Then, the lock protrusions 822 of the band lock portion 82 are selectively locked to the plurality of lock recesses 814 of the band 81, and thus the band 81 is kept in a state of being wound around the electrical wire 9. Note that the lock recesses 814 of the band 81 and the lock protrusions 822 and the band lock portion 82 are selectively locked to each other according to the diameter of the electrical wire 9.

In the present embodiment, the band 81 is kept in a state of being wound around the electrical wire 9 such that the band 81 penetrates through the band lock portion 82 and a portion of the band 81 protrudes from the band lock portion 82. That is, the band 81 is kept in a state of being wound around the electrical wire 9 such that a portion of the elongated portion 813 of the band 81 protrudes from the through hole 821 toward the other surface of the band lock portion 82. In the following description, the portion of the elongated portion 813, which protrudes from the through hole 821, is referred to as a distal end portion of the band 81. The distal end portion includes a distal end 819, which is opposite to the proximal end 811 of the band 81. If the portion of the elongated portion 813 protruding from the through hole 821 is relatively long, for example, the portion of the elongated portion 813 protruding from the through hole 821 is to be partially removed. If this is the case, a portion of the elongated portion 813 that protrudes from the through hole 821 after the removal has been performed is the distal end portion, and the end of the distal end portion after the removal has been performed is the distal end 819. Since the attachment member 8 includes a portion, of the band 81, that protrudes toward the bottom 31 from the band lock portion 82 (a portion that includes the distal end 819), the band 81 that is wound around the electrical wire 9 is less likely to come loose from the band lock portion 82.

Next, the following describes the slidable portions 88 of the band lock portion 82. The slidable portions 88 are portions that are supported by the slide supporting portion 33 so as to be slidable in the first direction X. In this example, each slidable portion 88 includes a pair of slidable side walls 882 that define a recessed groove 881 that has a recessed shape. In the protector-equipped wire harness 100, the recessed grooves 881 penetrate through the band lock portion 82 in the first direction X.

Also, in the present embodiment, a pair of slidable side walls 882 on both sides of the recessed groove 881 in each slidable portion 88 are formed such that base end-side portions of the slidable side walls 882 are thinner than leading end-side portions of the slidable side walls 882. In this example, a portion of the inner surfaces of each pair of slidable side walls 882 is recessed, and the width of a leading end-side portion of each recessed groove 881 with respect to the leading ends of the slidable side walls 882 is smaller than the width of a base end-side portion of the recessed groove 881 with respect to the base ends of the slidable side walls 882. In this case, leading end-side portions of the slidable side walls 882 can easily deform to increase the width of the recessed grooves 881.

Note that, in another example, a portion of the outer surfaces of each pair of slidable side walls may be recessed such that base end-side portions of the slidable side walls are thinner than lead end-side portions of the slidable side walls. If this is the case, the width of the recessed grooves is constant from the leading end portions to the base end portions of the slidable side walls, and leading end-side portions of the slidable side walls can easily deform to increase the width of the recessed grooves.

As shown in FIG. 2, in the present embodiment, the recessed grooves 881 are each provided on either one side of the through hole 821. Therefore, in this example, the slidable portions 88 include two pairs of slidable side walls 882, each pair being provided on either one side of the through hole 821. The respective openings of the two recessed grooves 881 provided on both sides of the through hole 821 face opposite directions. This is because a pair of edge portions 35, which will be described later, are to be passed through the two recessed grooves 881 of the slidable portions 88. The details of the slidable portions 88 will be described later.

Next, the following describes the protector 2. The protector 2 is a member that covers the electrical wire 9 to protect the electrical wire 9. The protector 2 may be a member that is made of resin, for example. In this example, as shown in FIG. 1, the protector 2 has a shape that can protect a straight section of the electrical wire 9. However, the protector 2 may have a shape that can protect a curved section of the electrical wire 9, or a shape that can protect both a curved section and a straight section of the electrical wire 9, for example.

In the present embodiment, as shown in FIGS. 1 and 3 to 8, the protector 2 includes: the bottom 31; a pair of side walls 32 that protrude from the bottom 31; the slide supporting portion 33 that is provided for at least one of the pair of side walls 32 and is formed so as to extend in the first direction X, which is a direction from the leading ends of the side walls 32 to the bottom 31; a receiver 34 that is provided on a bottom 31-side portion of the slide supporting portion 33; and the lid 4. In the present embodiment, the protector 2 further includes retaining protrusions 36 and a cover 37.

In this example, as shown in FIG. 1, the protector 2 includes the protector body 3 and the lid 4. As shown in FIGS. 1, 3, and 4, the protector body 3 includes the bottom 31, the pair of side walls 32, the slide supporting portion 33, the receiver 34, the retaining protrusions 36, and the cover 37. Also, in this example, the pair of side walls 32 are provided with first fixing portions 321 for fixing the lid 4 to the protector body 3.

First, the following describes the pair of side walls 32 of the protector 2. The pair of side walls 32 are formed so as to protrude from the bottom 31 toward the electrical wire 9. At least one of the side walls 32 is provided with the slide supporting portion 33 and the receiver 34. In this example, one of the side walls 32 is provided with the slide supporting portion 33 and the receiver 34. In the following description, the side wall 32 on which the slide supporting portion 33 and the receiver 34 are formed is referred to as "the one side wall 320". Also, in the present embodiment, the side walls 32 are provided with the first fixing portions 321 for fixing the lid 4, in addition to the slide supporting portion 33 and the receiver 34. The one side wall 320 is also provided with the retaining protrusions 36 and the cover 37.

Note that, in another example, as a matter of course, a slide supporting portion and a receiver may be provided on both of the pair of side walls. For example, if two or more attachment members are provided for one electrical wire, and the respective band lock portions of the two attachment members are located at opposite positions with respect to the electrical wire, the respective slidable portions of the two attachment members may be supported by the slide supporting portions provided on both of the pair of side walls.

Next, the following describes the slide supporting portion 33, the receiver 34, the retaining protrusions 36, and the cover 37 that are formed on the one side wall 320.

The slide supporting portion 33 is formed so as to extend in the first direction X. In the present embodiment, a slit 39 that extends in the first direction X, which is a direction from the leading end of the one side wall 320 to the bottom 31, is formed in the one side wall 320. Also, in this example, the slide supporting portion 33 includes at least one of a pair of edge portions 35 that are located opposite to each other with respect to the slit 39 that is formed in the one side wall 320 so as to extend in the first direction X. In this example, the slide supporting portion 33 includes both of the pair of edge portions 35.

Incidentally, in this example, as shown in FIG. 5, the receiver 34 and the cover 37, which will be described later, are provided for a bottom 31-side portion of the slit 39. Therefore, in this example, the slit 39 is provided in the region from the leading end of the one side wall 320 to a position immediately above the bottom 31. In other words, the slide supporting portion 33 is formed so as to extend in the first direction X in the region from the leading end of the one side wall 320 to a position immediately above the bottom 31. Note that a band insertion through hole 371 that is surrounded by the cover 37 and penetrates through the bottom 31 in the first direction X as described later is provided on a bottom 31-side extension of the slit 39.

The following describes a relationship between the slidable portions 88 and the slide supporting portion 33. In the protector-equipped wire harness 100, each of the recessed grooves 881 of the slidable portions 88 of the band lock portion 82 is recessed so as to allow one of the pair of edge portions 35 of the slide supporting portion 33 to pass therethrough. Therefore, for example, the width of the pair of slidable side walls 882 on both sides of each recessed groove 881 may be equal to the thickness of one of the pair of edge portions 35 (the length in a direction in which the pair of side walls 32 face each other), or larger than the thickness of one of the pair of edge portions 35. Note that, in this example, a portion of the inner surfaces of each pair of slidable side walls 882 is recessed, and the width of each recessed groove 881 is smaller at a leading end-side position with respect to the leading ends of the slidable side walls 882 than at a base-end side position with respect to the base ends of the slidable side walls 882. Therefore, in this example, as shown in FIG. 3, the width of the pair of slidable side walls 882 at a leading end-side position with respect to the leading ends of the slidable side walls 882 is equal to the thickness of one of the pair of edge portions 35, and the width of the pair of slidable side walls 882 at a base end-side position with respect to the base ends of the slidable side walls 882 is larger than the thickness of one of the pair of edge portions 35.

Note that, in another example, the width between the pair of slidable side walls on two sides of each recessed groove may be smaller than the thickness of one of the pair of edge portions. If this is the case, one of the pair of edge portions may be passed through a recessed groove and moved to slide in the first direction X in a state where the recessed groove has deformed to increase the width thereof, and thus the slidable portion may be supported by the slide supporting portion so as to be slidable.

In the present embodiment, the band lock portion 82 is moved to slide in the slit 39 in the first direction X toward the bottom 31 in a state where the pair of edge portions 35 of the slide supporting portion 33 are respectively passed through the two recessed grooves 881 of the band lock portion 82, and thus the slidable portions 88 are supported by the slide supporting portion 33 so as to be slidable. Therefore, the slit 39 may be a slit that has a certain width in the lengthwise direction of the protector 2 and that allows the band lock portion 82 to move in the first direction X. For example, the width of the slit 39 in the lengthwise direction of the protector 2 may be equal to the distance between the bottoms of the two recessed grooves 881 of the band lock portion 82, or larger than the distance between the bottoms of the two recessed grooves 881 of the band lock portion 82. Note that the aforementioned lengthwise direction of the protector 2 coincides with the lengthwise direction of the electrical wire 9 of the protector-equipped wire harness 100.

Next, the following describes the receiver 34 and the cover 37. The receiver 34 is provided on a bottom 31-side portion of the slide supporting portion 33. The receiver 34 is configured to be able to come into contact with at least a portion of the band lock portion 82 including the slidable portions 88 that are supported by the slide supporting portion 33 so as to be slidable. In the protector-equipped wire harness 100, the band lock portion 82 of the attachment member 8 comes into contact with the receiver 34, and thus the protector 2 and the attachment member 8 are fixed to each other. Note that the receiver 34 in this example includes a portion of the cover 37.

In the present embodiment, the recessed grooves 881 of the slidable portions 88 are inserted between the pair of edge portions 35 of the slide supporting portion 33 in a state where the distal end 819 of the band 81 protrudes in the first direction X toward the bottom 31, and the band lock portion 82 is moved in a direction from the leading end of the one side wall 320 to the bottom 31. Here, as shown in FIGS. 7 and 8, the cover 37 is provided for a bottom-side portion of the slit 39.

The cover 37 is a portion that covers at least a portion around the distal end 819 of the band 81 that protrudes toward the bottom 31 in the first direction X. That is, the cover 37 covers at least a portion around the distal end 819 of the band 81 in a state where the distal end 819 of the band 81 protrudes in the first direction X. In this example, as shown in FIGS. 4 and 8, the band insertion through hole 371 that is surrounded by the cover 37 and penetrates through the bottom 31 in the first direction X is provided on a bottom 31-side extension of the slit 39. The distal end 819 of the band 81 is inserted through the band insertion through hole 371.

In this example, the cover 37 includes a portion that covers the distal end 819 of the band 81 from the outside and a portion that covers the distal end 819 of the band 81 from a lateral side. More specifically, the cover 37 includes a portion that is provided outside the one side wall 320 and covers the distal end 819 of the band 81 from the outside, and a portion that protrudes outward from the outer surface of the one side wall 320 and covers the distal end 819 of the band 81 from a lateral side. Therefore, in the present embodiment, the distal end 819 of the band 81 is prevented from coming into contact with members around the protector 2.

Note that, in another example, the cover may include only a portion that covers the distal end of the band from the outside, or only a portion that covers the distal end of the band from a lateral side.

In the present embodiment, a leading end-side portion of the cover 37 with respect to the leading end of the one side wall 320 constitutes the receiver 34. Therefore, a surface, which faces toward the bottom 31, of the band lock portion 82 that has moved in a direction from the leading end of the one side wall 320 to the bottom 31 comes into contact with a leading end-side portion (i.e. the receiver 34) of the cover 37 with respect to the leading end of the one side wall 320 and thus the band lock portion 82 is restricted from moving in the first direction X toward the bottom 31.

Note that, in another example, the receiver may come into contact with a surface other than the bottommost surface of the band lock portion. For example, the receiver may come into contact with a protruding portion that protrudes from a lateral side of the band lock portion, from the bottom side of the protector body, and thus the band lock portion may be restricted from moving in the first direction X toward the bottom.

Also, in the present embodiment, as shown in FIG. 8, a portion of the band 81, which includes the distal end 819 that protrudes from the band lock portion 82 to the bottom 31 side, is passed through the band insertion through hole 371 in a state where the band lock portion 82 is restricted by the receiver 34 from moving in the first direction X. Here, the distal end 819 of the band 81 does not protrude from the band insertion through hole 371 toward the bottom surface of the bottom 31. That is, the length of a portion of the band 81 in the first direction X, the portion protruding from the band lock portion 82, is smaller than the length of the cover 37 in the first direction X in a state where the band lock portion 82 is restricted by the receiver 34 from moving in the first direction X. In this case, for example, the portion of the band 81, which protrudes from the band lock portion 82, may be cut off so that the length of the portion of the band 81 in the first direction X, the portion protruding from the band lock portion 82, is smaller than the length of the cover 37 in the first direction X in a state where the band lock portion 82 is restricted by the receiver 34 from moving in the first direction X. In the above-described case, it is possible to more reliably cover the distal end 819 of the band 81, and restrict the distal end 819 of the band 81 from protruding outward from the bottom 31.

Next, the following describes the retaining protrusions 36. The retaining protrusions 36 are portions that are locked to the band lock portion 82 from a side to prevent the slidable portions 88 from coming loose from the slide supporting portion 33 in a state where the band lock portion 82 is in contact with the receiver 34. In this example, the retaining protrusions 36 are formed on the outer surface of the one side wall 320. In this example, as shown in FIGS. 1 and 7, each retaining protrusion 36 includes an inclined portion that is located on the outer surface side of the one side wall 320 and is inclined so that the outward protruding length thereof gradually increases in a direction toward the bottom 31, and a wall portion that is continuous with a bottom 31-side portion of the inclined portion and includes a wall-shaped portion that protrudes outward from the outer surface of the one side wall 320. Note that, in this example, the wall portion protrudes so as to be orthogonal to the outer surface of the one side wall 320.

In this example, if the band lock portion 82 is moved in a direction from the leading end of the one side wall 320 to the bottom 31 in a state where the edge portions 35 of the slide supporting portion 33 are passed through the recessed grooves 881 of the slidable portions 88, the recessed grooves 881 will come into contact with the inclined portions of the retaining protrusions 36. Then, if the band lock portion 82 is further moved toward the bottom 31, the band lock portion 82 elastically deforms along the slopes of the inclined portions to increase the distance between each pair of slidable side walls 882. Note that, in this example, each pair of slidable side walls 882 on both sides of each recessed groove 881 are formed such that base end-side portions of the slidable side walls 882 are thinner than leading end-side portions of the slidable side walls 882, and therefore the pairs of slidable side walls 882 can easily increase in width along the inclined portions of the retaining protrusions 36. Consequently, it is easier to perform an operation to move the band lock portion 82 in the first direction X toward the bottom 31. Then, after the recessed grooves 881 have been moved past the inclined portions of the retaining protrusions 36, the recessed grooves 881 reach the wall portions, and consequently the pair of slidable side walls 882 return to their original shape. Thereafter, the band lock portion 82 is moved to the receiver 34, and thus the band lock portion 82 is restricted from moving in the first direction X toward the bottom 31.

In this example, if the band lock portion 82 is moved in the first direction X toward the leading end of the one side wall 320 in a state where a bottom 31-side portion of the band lock portion 82 is in contact with the receiver 34, a leading end-side portion of the band lock portion 82 with respect to the leading end of the one side wall 320 comes into contact with the wall portions of the retaining protrusions 36. Since the wall portions include wall-shaped portions that are orthogonal to the one side wall 320, the wall portions prevent the recessed grooves 881 of the band lock portion 82 from moving toward the leading ends of the one side wall 320 past the retaining protrusions 36. Consequently, it is possible to prevent the slidable portions 88 from moving from a bottom 31-side position to a leading end-side position of the one side wall 320 and coming loose from the slide supporting portion 33.

Note that, in this example, a gap is provided between each retaining protrusion 36 and a leading end-side portion of the band lock portion 82 with respect to the leading end of the one side wall 320, in order to prevent them from coming into contact with each other in a state where a bottom 31-side portion of the band lock portion 82 is in contact with the receiver 34. However, in another example, each retaining protrusion and a leading end-side portion of the band lock portion with respect to the leading end of the one side wall may be in contact with each other in a state where a bottom-side portion of the band lock portion is in contact with the receiver.

Also, in another example, the retaining protrusions may be formed on the inner surface of the one side wall. If this is the case, each retaining protrusion may include an inclined portion that is located on the inner surface side of the one side wall and is inclined so that the inward protruding length thereof (protruding toward the electrical wire disposed in the groove) gradually increases in a direction toward the bottom, and a wall portion that is continuous with a bottom-side portion of the inclined portion and includes a wall-shaped portion that protrudes inward from the inner surface of the one side wall.

Next, the following describes the first fixing portions 321. In this example, as shown in FIGS. 1, 3, and 4, the first fixing portions 321 for fixing the lid 4 are provided on both of the pair of side walls 32.

Also, as shown in FIGS. 1 and 3, each side wall 32 is provided with two first fixing portions 321. Note that the first fixing portions 321 on the one side wall 320 are provided on portions on both sides of the portion of the one side wall 320 on which the slide supporting portion 33 is provided.

Also, in this example, the protector body 3 is provided with four first fixing portions 321 in total. Also, in another mode, one side wall may be provided with one first fixing portion, or three or more first fixing portions.

In this example, as shown in FIGS. 1, 3, and 4, each first fixing portion 321 of the protector body 3 includes a pair of first portions 328 that protrude outward from the outer surface of a side wall 32, and a second portion 329 that is a portion between the first portions 328 and is opposite to the outer surface of the side wall 32 with respect to a gap therebetween. Also, lid fixing through holes 322, which are each surrounded by the side wall 32 and the first fixing portions 321 and penetrate in the first direction X, are formed. Second fixing portions 42 of the lid 4 are inserted into the lid fixing through holes 322. The details will be described later.

Also, in the present embodiment, the portion of the one side wall 320, on which the slide supporting portion 33 is provided, protrudes more outward compared to the portions on both sides of the portion of the one side wall 320 on which the slide supporting portion 33 is provided. In this example, in plan view of the protector body 3 as shown in FIGS. 3 and 4, the one side wall 320 includes curved portions (curved portions 325) so that the outward protruding length of the one side wall 320 gradually increases, from the portions of the one side wall 320 on which the first fixing portions 321 are provided to the portion of the one side wall 320 on which the slide supporting portion 33 is provided, in the lengthwise direction of the protector 2. Note that, in this example, the curved portions 325 are provided on both sides of the portion of the one side wall 320 on which the slide supporting portion 33 is provided.

As shown in FIG. 3, for example, the curved portions 325 are portions that are formed so as to curve such that the portion of the one side wall 320 on which the slide supporting portion 33 is provided is displaced outward of the portions of the one side wall 320 on which the first fixing portions 321 are provided, by a distance corresponding to the thickness of the band lock portion 82. Note that the thickness of the band lock portion 82 is the thickness of the band lock portion 82 in the direction in which each pair of slidable side walls 882 face each other. In this case, as shown in FIG. 3, it is possible to prevent a relatively large space from being formed between the inner surface of the one side wall 320 and the electrical wire 9, at the positions of the portions of the one side wall 320 on which the first fixing portions 321 are provided. Also, since the curved portions 325 are formed, it is possible to increase the width of the groove 30 at the position of the portion of the one side wall 320 on which the slide supporting portion 33 is provided, therefore it is possible to provide a space in which the band lock portion 82 can be moved in the first direction X.

Next, the following describes the bottom 31 of the protector body 3. The electrical wire 9 is disposed on the bottom 31. In this example, the bottom 31 has a flat shape.

Next, the following describes the lid 4 of the protector 2. In this example, the protector body 3 and the lid 4 are separate members. The protector 2 can be obtained by attaching the lid 4 to the protector body 3. As shown in FIGS. 6 to 8, the lid 4 of the protector 2 includes: a plate-shaped member 41 that is opposite to the bottom 31 of the protector body 3; the second fixing portions 42 for fixing the lid 4 to the protector body 3; a pair of rising portions 43 that protrude from the plate-shaped member 41 to the protector body 3 side; and a contact portion 44 that can come into contact with the band lock portion 82 of the attachment member 8. In the present embodiment, the lid 4 further includes a gripping portion 45.

In the present embodiment, the plate-shaped member 41 is a portion that is opposite to the bottom 31, and has a flat shape in this example. In this example, the plate-shaped member 41 has a shape that corresponds to the bottom 31.

Also, as shown in FIG. 1, the pair of rising portions 43 protrude from the side edges of the plate-shaped member 41 toward the bottom 31. The second fixing portions 42 and the contact portion 44, which will be described later, are formed continuously with the pair of rising portions 43.

The second fixing portions 42 are portions that protrude further toward the bottom 31 from the pair of rising portions 43. The second fixing portions 42 are located at positions that correspond to the portions of the pair of side walls 32 on which the first fixing portions 321 are provided.

In this example, as shown in FIG. 1, each second fixing portion 42 includes a lid inclined portion that is inclined so that the outward protruding length thereof gradually increases in a direction from the bottom 31 to the plate-shaped member 41, and a lid wall portion that is a portion that is continuous with a plate-shaped member 41-side portion of the lid inclined portions and protrudes outward from a rising portion 43 in a direction in which the pair of rising portions 43 face each other. Note that, in this example, each lid wall portion protrudes in a direction that is orthogonal to the direction in which the rising portions 43 protrude.

In this example, the second fixing portions 42 are inserted into the lid fixing through holes 322 that are each surrounded by a side wall 32 and a first fixing portion 321 of the protector body 3. Then, the second fixing portions 42 deform along the lid inclined portions, and the lid inclined portions pass through the lid fixing through holes 322. Thereafter, the second fixing portions 42 return to their original shape, the lid wall portions of the second fixing portions 42 come into contact with bottom 31-side portions of the second portions 329 of the first fixing portions 321, and the first fixing portions 321 and the second fixing portions 42 are locked to each other. Thus, the lid 4 is combined with the protector body 3 into one piece.

Next, the following describes the contact portion 44 and the gripping portion 45. The gripping portion 45 is a portion that sandwiches the pair of edge portions 35 from the inner surface side and the outer surface side of the one side wall 320. The gripping portion 45 includes wall-shaped portions that can sandwich the pair of edge portions 35 from the inner surface side and the outer surface side in a state where the protector body 3 and the lid 4 are fixed to each other. In this example, the gripping portion 45 includes: the contact portion 44 that protrudes further in a direction from a rising portion 43 to the bottom 31 from a portion of the lid 4, the portion corresponding to the pair of edge portions 35 of the protector body 3, and is located on the outer surface side of the pair of edge portions 35; and a protruding portion 46 that protrudes from a portion of the lid 4, the portion corresponding to the pair of edge portions 35 of the protector body 3, in a direction from the plate-shaped member 41 to the bottom 31, and is located on the inner surface side of the pair of edge portions 35. In this example, the contact portion 44 and the protruding portion 46 each have a wall shape that enables the contact portion 44 and the protruding portion 46 to sandwich the pair of edge portions 35 from the inner surface side and the outer surface side.

In the present embodiment, the contact portion 44 and the protruding portion 46 sandwich the pair of edge portions 35 of the one side wall 320 from the inner surface side and the outer surface side to prevent the pair of edge portions 35 from deforming. Here, for example, it is preferable that the distance between the contact portion 44 and the protruding portion 46 is equal to the thickness of each of the pair of edge portions 35. This configuration makes it easier to sandwich the pair of edge portions 35 using the gripping portion 45, while preventing the pair of edge portions 35 from deforming.

Note that, in another example, the distance between the contact portion and the protruding portion may be larger than the thickness of each of the pair of edge portions. If this is the case, it is preferable that the distance between the contact portion and the protruding portion is slightly larger than the thickness of each of the pair of edge portions. Note that, in yet another example, the distance between the contact portion and the protruding portion may be smaller than the thickness of each of the pair of edge portions. If this is the case, the contact portion and the protruding portion may be configured to be deformable such that the distance between the contact portion and the protruding portion increases when they sandwich the pair of edge portions, and it is preferable that the distance is slightly smaller than the thickness of each of the pair of edge portions.

Also, in the present embodiment, as shown in FIGS. 1, 7, and 8, the contact portion 44 is configured to be able to come into contact with a leading end-side portion of the band lock portion 82 with respect to the leading end of the one side wall 320. In this example, as shown in FIGS. 7 and 8, the contact portion 44 has a protruding length that enables the contact portion 44 to come into contact with a leading end side portion of the band lock portion 82 with respect to the leading end of the one side wall 320 in a state where the protector body 3 and the lid 4 are fixed to each other and a bottom 31-side portion of the band lock portion 82 is in contact with the receiver 34. In this case, the band lock portion 82 is fixed by being sandwiched between the receiver 34 and the contact portion 44. Therefore, it is possible to more stably fix the band lock portion 82 and the protector body 3 to each other.

Next, the following describes an example of a method for obtaining the protector-equipped wire harness 100 that is provided with the protector 2 and the attachment member 8. In the present embodiment, first, the band 81 of the attachment member 8 is wound around the electrical wire 9. Thereafter, the pair of edge portions 35 of the protector body 3 are passed through the recessed grooves 881 of the band lock portion 82, and thus the slidable portions 88 of the band lock portion 82 are supported by the slide supporting portion 33 so as to be slidable in the first direction X.

Thereafter, the band lock portion 82 is moved in the first direction X toward the bottom 31. Then, a bottom 31-side portion of the band lock portion 82 comes into contact with the receiver 34, and thus the band lock portion 82 is restricted from moving in the first direction X toward the bottom 31. Here, in the present embodiment, due to the retaining protrusions 36 being provided, the band lock portion 82 in a state of being in contact with the receiver 34 is prevented from moving toward the leading end of the one side wall 320 and coming loose from the slide supporting portion 33.

Then, in a state where the attachment member 8 is fixed to the protector body 3, the lid 4 is placed onto the one side wall 320 from the leading end side of the one side wall 320, the first fixing portions 321 and the second fixing portions 42 are locked to each other, and thus the protector body 3 and the lid 4 are combined into one piece. When the protector body 3 and the lid 4 are combined into one piece, the contact portion 44 of the lid 4 comes into contact with a leading end-side portion of the band lock portion 82 with respect to the leading end of the one side wall 320. Thus, the band lock portion 82 is sandwiched between the receiver 34 and the contact portion 44, and the band lock portion 82 is positioned.

Regarding the present embodiment, through the above-described work, it is possible to obtain the protector-equipped wire harness 100 according to the present embodiment, which is provided with the protector 2 and the attachment member 8. The protector-equipped wire harness 100 can be mounted on a vehicle such as an automobile, for example.

Effects

In the present embodiment, regarding the slidable portions 88 of the attachment member 8, the slide supporting portion 33 formed on the one side wall 320 of the protector 2 allows the slidable portions 88 of the attachment member 8 to slide in the first direction X so that the band lock portion 82 comes into contact with the receiver 34, and thus the protector 2 and the attachment member 8 are fixed to each other. In this case, there is no need to use a conventional clamp or the like to fix the protector 2 and the attachment member 8 to each other. Therefore, it is possible to prevent a portion of the protector 2 to which the electrical wire 9 is fixed from protruding outward from the outer surface of the protector 2 by a large length.

Also, in the present embodiment, the protector 2 is provided with the retaining protrusions 36. Therefore, it is possible to prevent the slidable portions 88 from moving from a bottom 31-side position to a leading end-side position of the one side wall 320 and coming loose from the slide supporting portion 33. Thus, it is possible to prevent the protector 2 and the attachment member 8 from being released from a state of being fixed to each other.

Also, in the present embodiment, a portion of the one side wall 320, on which the slide supporting portion 33 is provided, protrudes more outward compared to a portion other than the portion of the one side wall 320 on which the slide supporting portion 33 is provided. In this case, it is possible to reduce the width of a portion other than the portion of the protector 2 on which the slide supporting portion 33 is provided, and it is possible to reduce the space required for the protector-equipped wire harness 100.

Also, the present embodiment includes the cover 37 that covers at least a portion around the distal end 819 of the band 81. Therefore, it is possible to prevent the distal end 819 of the band 81 from coming into contact with members around the protector-equipped wire harness 100. Note that, in the present embodiment, the cover 37 covers the entire circumference of the distal end 819 of the band 81. Therefore, it is possible to more reliably prevent the distal end 819 of the band 81 from coming into contact with members around the protector-equipped wire harness 100.

Also, in the present embodiment, the slide supporting portion 33 includes at least one of a pair of edge portions 35 that are located opposite to each other with respect to the slit 39 that extends in the first direction X, and each slidable portion 88 includes a recessed groove 881 that is recessed so as to allow at least one of the pair of edge portions 35 to pass therethrough. In this case, it is possible to fix the protector 2 and the attachment member 8 to each other using the slide supporting portion 33 and the slidable portions 88, which have a simple configuration including the slit 39 that is formed in the one side wall 320 and the recessed grooves 881 that are recessed so as to allow at least one of the pair of edge portions 35 that are located opposite to each other with respect to the slit 39 to pass therethrough.

Also, in the present embodiment, each slidable portion 88 includes a pair of slidable side walls 882 that define a recessed groove 881. Base end-side portions of the slidable side walls 882 are thinner than leading end-side portions of the slidable side walls 882. In this case, when the slide supporting portion 33 allows the slidable portions 88 to be moved in the first direction X, the recessed grooves 881 are likely to deform such that the width of leading end-side portions thereof increases.

Also, in the present embodiment, the protector 2 includes the lid 4, and the lid 4 includes the gripping portion 45 that sandwiches the pair of edge portions 35 from the inner surface side and the outer surface side of the one side wall 320. That is, the gripping portion 45 grips portions near the pair of edge portions 35, which are portions on both sides of the slit 39 in the one side wall 320, and thus the gripping portion 45 prevents the portions near the pair of edge portions 35 from deforming. Note that, in the present embodiment, the lid 4 is configured to be able to sandwich the portions of the one side wall 320 on which the first fixing portions 321 are provided, from the inner surface side and the outer surface side. In this case, it is possible to prevent the portions of the one side wall 320 on which the first fixing portions 321 are provided from deforming.

Also, in the present embodiment, the lid 4 includes the contact portion 44 that extends toward the bottom 31. In the protector-equipped wire harness 100, the band lock portion 82 is fixed by being sandwiched between the receiver 34 and the contact portion 44. In this case, it is possible to more stably fix the protector 2 and the attachment member 8 to each other.

First Modification

Figure 9:
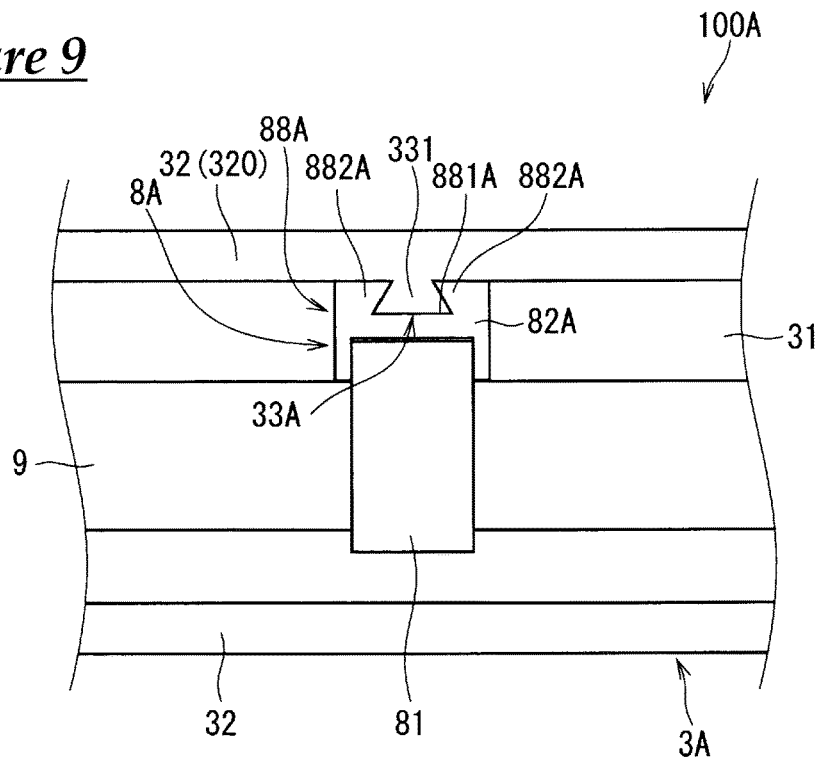
FIG. 9 is a plan view of a portion of a protector of a protector-equipped wire harness according to a first modification and an electrical wire.

Next, a protector-equipped wire harness 100A according to a first modification will be described with reference to FIG. 9. The protector-equipped wire harness 100A includes a slidable portion 88A and a slide supporting portion 33A that have configurations different from those of the slidable portions 88 and the slide supporting portion 33 according to the embodiment. FIG. 9 is a plan view of a portion of the protector 2, and is specifically a plan view of a protector body 3A in which the electrical wire 9 is disposed. Note that the lid 4 is omitted from FIG. 9. Also, in FIG. 9, constituent elements that are the same as those shown in FIGS. 1 to 8 are assigned the same reference numerals. The following describes features of the present modification that are different from those of the embodiment.

Components of the protector 2 other than the slide supporting portion 33A of the protector body 3A, and the lid 4, are the same as those in the embodiment, and therefore descriptions thereof are omitted.

As shown in FIG. 9, in this modification, the one side wall 320 is not provided with the slit 39 according to the embodiment. In this example, the slide supporting portion 33A includes a slide protrusion 331 that is provided on the inner surface side of the one side wall 320 and protrudes from the inner surface of the one side wall 320. The slide protrusion 331 is formed so as to extend in a direction from the leading end of the one side wall 320 to the bottom 31, i.e., in the first direction X.

Also, in the present modification, the slidable portion 88A of a band lock portion 82A includes a recessed groove 881A that is recessed so as to allow the slide protrusion 331 to pass therethrough. In this example, the recessed groove 881A is configured to allow sliding in the first direction X in a state of being fitted to the slide protrusion 331. Note that, in an attachment member 8A, components other than the slidable portion 88A are the same as those in the embodiment, and therefore descriptions thereof are omitted.

The following describes the details of the slide protrusion 331 and the recessed groove 881A. In this example, as shown in FIG. 9, the slide protrusion 331 is configured such that the width of a leading end-side portion thereof in the lengthwise direction of the protector 2 is longer than the width of a base end-side portion thereof, which is continuous with the inner surface of the one side wall 320, in the lengthwise direction of the protector 2. In this example, the slide protrusion 331 is configured such that the width thereof in the lengthwise direction of the protector 2 gradually increases in a direction from the base end to the leading end.

Also, in this example, the recessed groove 881A is a recessed groove that has a shape that corresponds to the shape of the contour of the slide protrusion 331 in plan view of the protector body 3A (i.e. when seen in the first direction X). That is, as shown in FIG. 9, the recessed groove 881A is configured such that the distance between a pair of slidable side walls 882A on both sides of the recessed groove 881A gradually increases in a direction from the opening to the bottom of the recessed groove 881A.

In the present modification, the band lock portion 82A is brought closer to the protector body 3A from the leading end side of the one side wall 320. Then, the recessed groove 881A of the slidable portion 88A of the band lock portion 82A and the slide protrusion 331 of the slide supporting portion 33A of the protector body 3A are aligned in the first direction X. Then, for example, the band lock portion 82A in this state is moved in the first direction X toward the bottom 31. Consequently, the slide protrusion 331 and the recessed groove 881A are fitted to each other. Then, the band lock portion 82A comes into contact with the receiver 34 that is provided on a bottom 31-side portion of the slide protrusion 331, and thus the attachment member 8A and the protector body 3A are fixed to each other.

With the above-described configuration, also in the present modification, regarding the slidable portion 88A of the attachment member 8A, the slide supporting portion 33A formed on the one side wall 320 of the protector 2 allows the slidable portion 88A of the attachment member 8A to slide in the first direction X so that the band lock portion 82A comes into contact with the receiver 34, and thus the protector 2 and the attachment member 8A are fixed to each other. In this case, there is no need to use a conventional clamp or the like to fix the protector 2 and the attachment member 8A to each other. Therefore, it is possible to prevent a portion of the protector 2 to which the electrical wire 9 is fixed from protruding outward from the outer surface of the protector 2 by a large length.

Also, in the present modification, the slide protrusion 331 is configured such that the width thereof in the lengthwise direction of the protector 2 gradually increases in a direction from the base end to the leading end, and the recessed groove 881A has a shape that corresponds to the shape of the contour of the slide protrusion 331 when seen in the first direction X. In this case, once the slide protrusion 331 and the recessed groove 881A are fitted to each other, when an attempt is made to move the band lock portion 82A relative to the protector body 3A in a direction in which the pair of side walls 32 face each other, the slide protrusion 331 and the recessed groove 881A are prevented from being released from the state of being fitted to each other. That is, it is possible to more stably fix the attachment member 8A and the protector 2 to each other.

Second Modification

Figure 10:
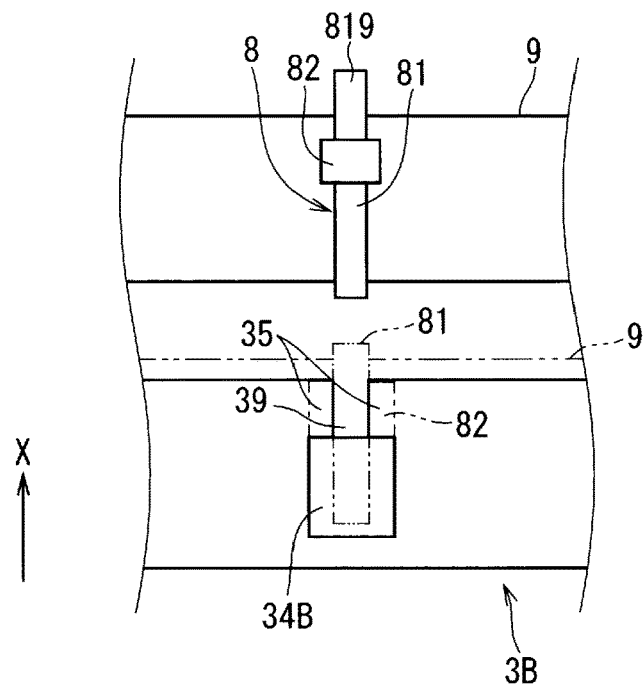
FIG. 10 is a side view of a portion of a protector of a protector-equipped wire harness according to a second modification and an electrical wire.
Figure 11:
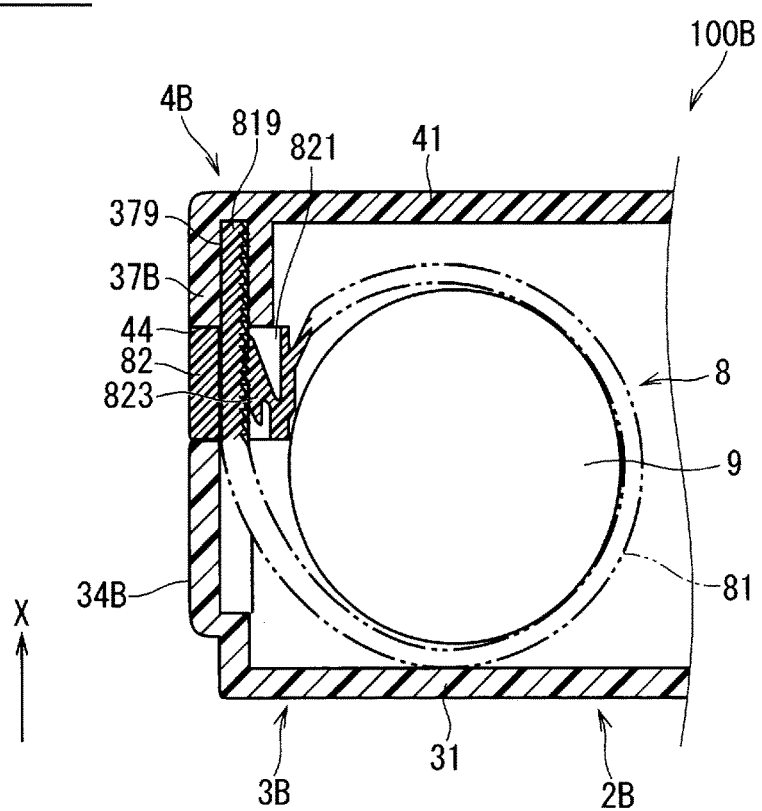
FIG. 11 is a cross-sectional view of the protector-equipped wire harness according to the second modification.
Figure 12:
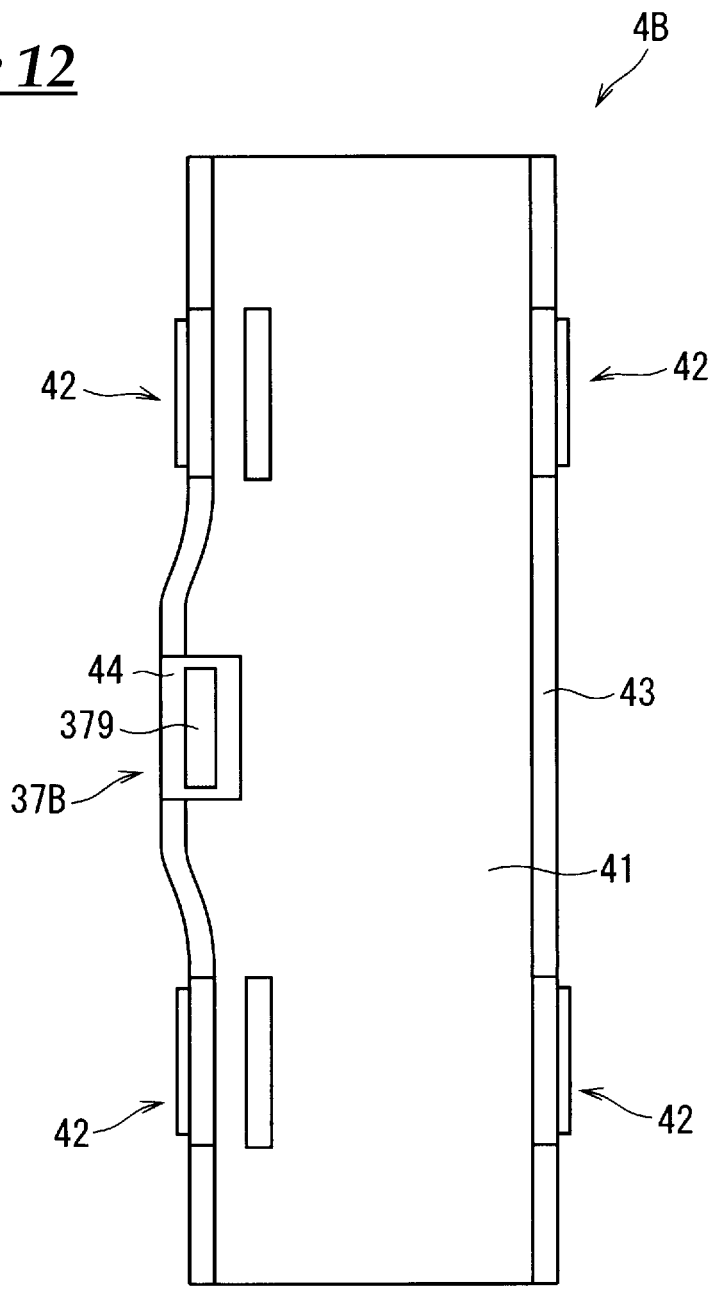
FIG. 12 is a plan view of a portion of the protector of the protector-equipped wire harness according to the second modification.

Next, a protector-equipped wire harness 100B according to a second modification will be described with reference to FIGS. 10 to 12. The protector-equipped wire harness 100B includes a protector 2B that has a configuration that is different from that of the protector 2 according to the embodiment. The protector 2B includes a protector body 3B and a lid 4B. FIG. 10 is a side view of a portion of the protector 2B and the electrical wire 9. FIG. 11 is a cross-sectional view of the protector-equipped wire harness 100B. FIG. 12 is a plan view of a portion of the protector 2B, and is specifically a plan view of the lid 4B. Note that FIG. 12 shows the back side of the lid 4B (the bottom 31 side when the lid 4B is attached to the protector body 3B). Note that, in FIGS. 10 to 12, constituent elements that are the same as those shown in FIGS. 1 to 9 are assigned the same reference numerals. The following describes features of the present modification that are different from those of the embodiment.

The protector-equipped wire harness 100B according to this modification is different from the embodiment in that the distal end 819 of the band 81 protrudes in the first direction X toward the lid 4B. In the present modification, the protector 2B includes a cover 37B that covers at least a portion around the distal end 819 of the band 81 in a state where the distal end 819 of the band 81 protrudes in the first direction X toward the lid 4B. More specifically, the lid 4B of the protector 2B is the cover 37B.

First, the following describes the lid 4B of the protector 2B. The lid 4B includes the plate-shaped member 41, the second fixing portions 42, the pair of rising portions 43, the contact portion 44 that can come into contact with the band lock portion 82 of the attachment member 8, and the cover 37B. The plate-shaped member 41, the second fixing portions 42, and the pair of rising portions 43 are the same as those in the embodiment, and therefore descriptions thereof are omitted.

In the present modification, the cover 37B is provided in the lid 4B at a position that corresponds to the slide supporting portion 33. In this example, as shown in FIGS. 11 and 12, the cover 37B includes a recessed depression 379 in which a portion of the band 81 (a portion including the distal end 819 of the band 81), the portion protruding from the band lock portion 82 in the first direction X toward the lid 4B, can be housed. In this example, the distal end 819 of the band 81 is housed in the depression 379, and thus the cover 37B covers the entire circumference of the distal end 819 of the band 81. That is, the cover 37B includes an outer portion that covers the distal end 819 of the band 81 from the outside and an inner portion that covers the same from the inside. Note that, in this example, the cover 37B further includes lateral side portions that cover the distal end of the band 81 from both sides. The lateral side portions are portions that connect the outer portion and the inner portion to each other. Also in this case, the distal end 819 of the band 81 is prevented from coming into contact with members around the protector 2B, and from coming into contact with the electrical wire 9 in the protector 2B.

The following describes the protector body 3B. The protector body 3B is formed by omitting the cover 37 from the protector body 3 according to the embodiment. Also, the protector body 3B is provided with a receiver 34B that is different from the embodiment.

The receiver 34B includes a wall-shaped portion that is located on the outer surface side of the one side wall 320 and faces the one side wall 320. In this example, as shown in FIG. 10, the receiver 34B covers a portion of the slit 39 from the outside in the first direction X. Also, the receiver 34B is formed so as to span a range from one of the pair of edge portions 35 to the other.

In this example, a leading end-side portion of the receiver 34B with respect to the leading end of the one side wall 320 and a bottom 31-side portion of the band lock portion 82 come into contact with each other, and thus the band lock portion 82 is prevented from moving toward the bottom 31 in the first direction X. Note that, in this example, as shown in FIGS. 10 and 11, a bottom 31-side portion of the cover 37B comes into contact with a lid 4B-side portion of the band lock portion 82 in a state where the band lock portion 82 is in contact with the receiver 34B. That is, in the present modification, the contact portion 44 of the lid 4B is a bottom 31-side portion of the cover 37B.

More specifically, in the present modification, the distance from the leading end-side portion of the receiver 34B with respect to the leading end of the one side wall 320 to the leading end of the one side wall 320 is equal to the length of the band lock portion 82 in the direction in which the through hole 821 penetrates (the length of the band lock portion 82 in the first direction X). In this case, the leading end surface of the one side wall 320 and the lid 4B-side surface of the band lock portion 82 are at the same level in the first direction X in a state where a bottom 31-side portion of the band lock portion 82 is in contact with the receiver 34B. Also, the cover 37B includes the depression 379 that has a depth that is the same as the protruding length of the portion of the band 81 protruding from the band lock portion 82, and thus a bottom 31-side portion of the cover 37B can come into contact with a lid 4B-side portion of the band lock portion 82. Consequently, the band lock portion 82 is sandwiched between the receiver 34B of the protector body 3B and the contact portion 44 of the lid 4B. Thus, it is possible to more stably fix the band lock portion 82 to the protector 2B.

Also, in another example, the distance from the leading end-side portion of the receiver with respect to the leading end of the one side wall to the leading end of the one side wall may be larger than the length of the band lock portion in the direction in which the through hole penetrates (the length of the band lock portion in the first direction). If this is the case, a portion of the inner portion, the outer portion, or the lateral side portions of the cover may be configured to protrude from the bottom side of the protector main body.

Also in the present modification, regarding the slidable portions 88 of the attachment member 8, the slide supporting portion 33 formed on the one side wall 320 of the protector 2B allows the slidable portions 88 of the attachment member 8 to slide in the first direction X so that the band lock portion 82 comes into contact with the receiver 34B, and thus the protector 2B and the attachment member 8 are fixed to each other. In this case, there is no need to use a conventional clamp or the like to fix the protector 2B and the attachment member 8 to each other. Therefore, it is possible to prevent a portion of the protector 2B to which the electrical wire 9 is fixed from protruding outward from the outer surface of the protector 2B by a large length.

Also, in the present modification, the distal end 819 of the band 81 is covered by the cover 37B of the lid 4B. Therefore, it is possible to prevent members around the protector-equipped wire harness 100B and the distal end 819 of the band 81 from coming into contact with each other.

Third Modification

Figure 13:
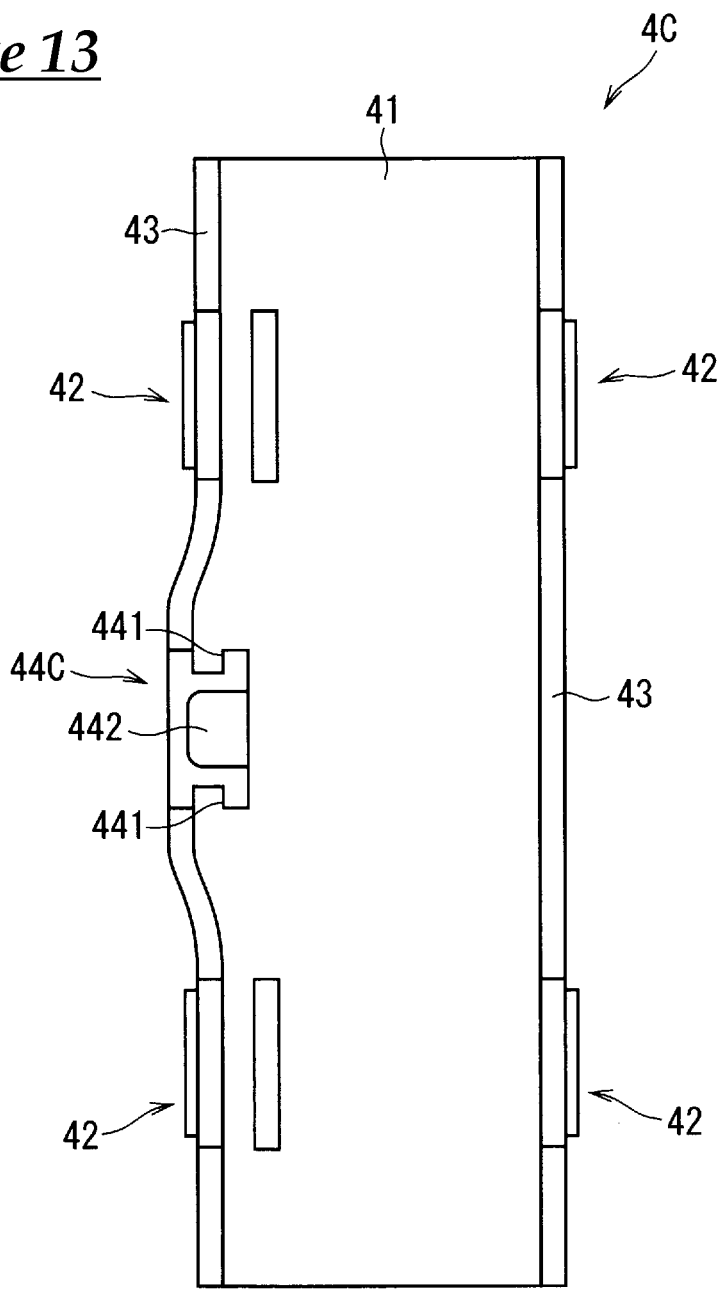
FIG. 13 is a plan view of a portion of a protector of a protector-equipped wire harness according to a third modification.

Next, a lid 4C that is included in a protector-equipped wire harness according to a third modification will be described with reference to FIG. 13. A protector-equipped wire harness according to the third modification includes a protector body that has the same configuration as in the embodiment, and the lid 4C that has a configuration that is different from the configuration in the embodiment. The following describes the lid 4C.

In the present modification, the lid 4C includes a contact portion 44C that has a configuration that is different from the configuration of the contact portion 44, when compared with the lid 4 in the embodiment. FIG. 13 is a plan view of the lid 4C. Note that FIG. 13 shows the back side of the lid 4C (the bottom side when the lid 4C is attached to the protector body). In FIG. 13, constituent elements that are the same as those shown in FIGS. 1 to 12 are assigned the same reference numerals.

In the present modification, a contact portion 44C of the lid 4C includes a pair of groove-shaped portions 441 that are recessed so as to allow the pair of edge portions 35 to pass therethrough in the first direction X. The pair of groove-shaped portions 441 are provided in the lid 4C at positions that correspond to the slide supporting portion 33 of the protector body 3. More specifically, the pair of groove-shaped portions 441 are located so as to allow the pair of edge portions 35 to pass through the pair of groove-shaped portions 441 in the lid 4C. For example, the contact portion 44C may have the same shape as the contour of the band lock portion 82.

Also, in this example, the contact portion 44C includes a recessed portion 442 that is recessed, on the back side of the lid 4C. The recessed portion 442 is a depression in which a portion of the band 81, the portion extending from the band lock portion 82 toward the leading end of the one side wall 320, can be housed. In this example, the recessed portion 442 may have a recessed surface that is curved along the outer circumferential surface of the band 81 wound around the electrical wire 9.

Also in the present modification, it is possible to prevent a portion of the protector to which the electrical wire 9 is fixed from protruding outward from the outer surface of the protector by a large length. Also, in the present modification, the contact portion 44C includes the groove-shaped portions 441 that have the same shape as the recessed grooves 881 of the band lock portion 82. In the case, it is possible to increase a contact area between the contact portion 44C and the leading end-side portion of the band lock portion 82 with respect to the leading end of the one side wall 320, and it is possible to more effectively prevent the band lock portion 82 from moving toward the leading end of the one side wall 320.

Second Embodiment

Figure 14:
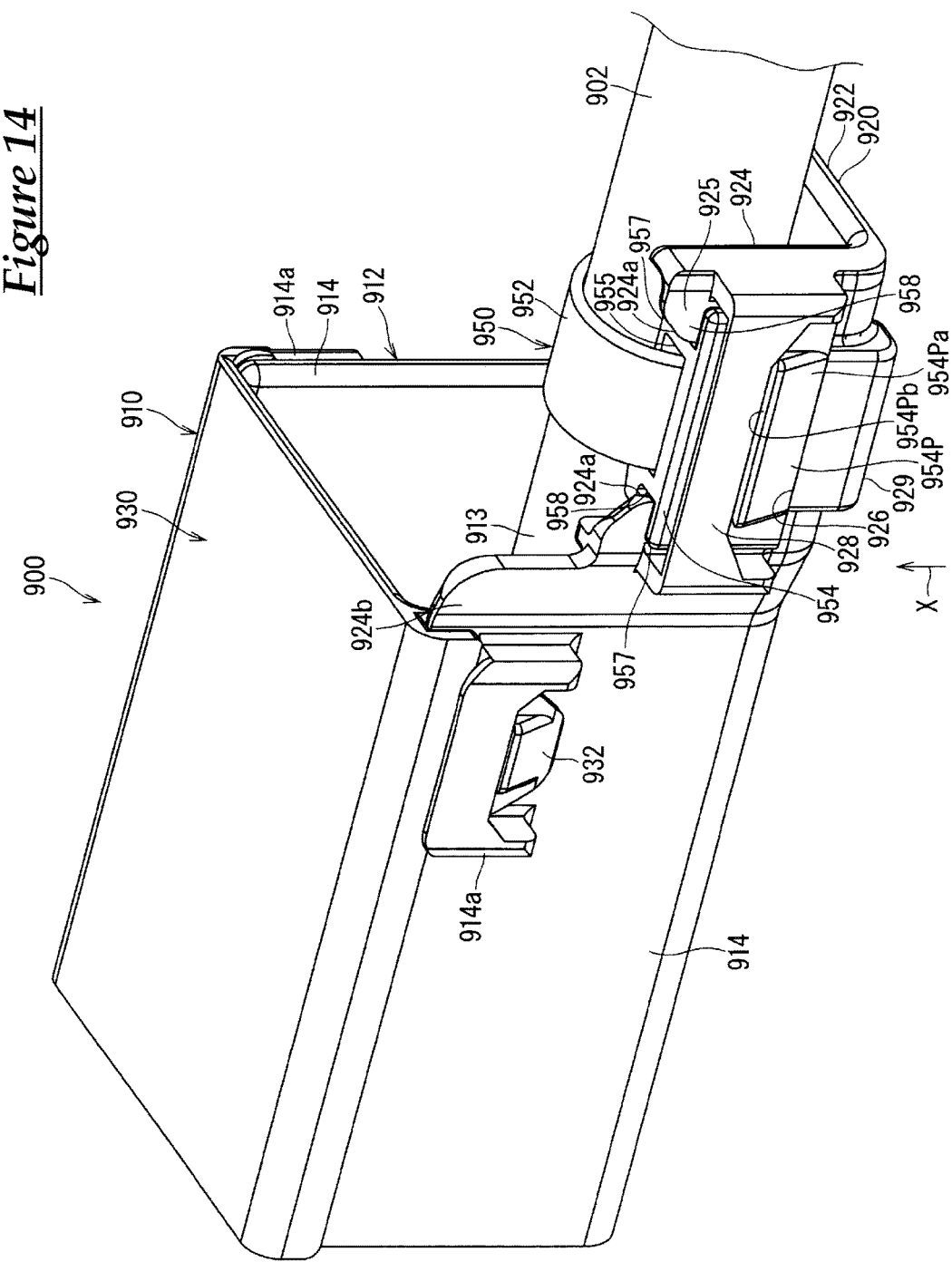
FIG. 14 is a perspective view of a protector-equipped wire harness according to a second embodiment.
Figure 15:
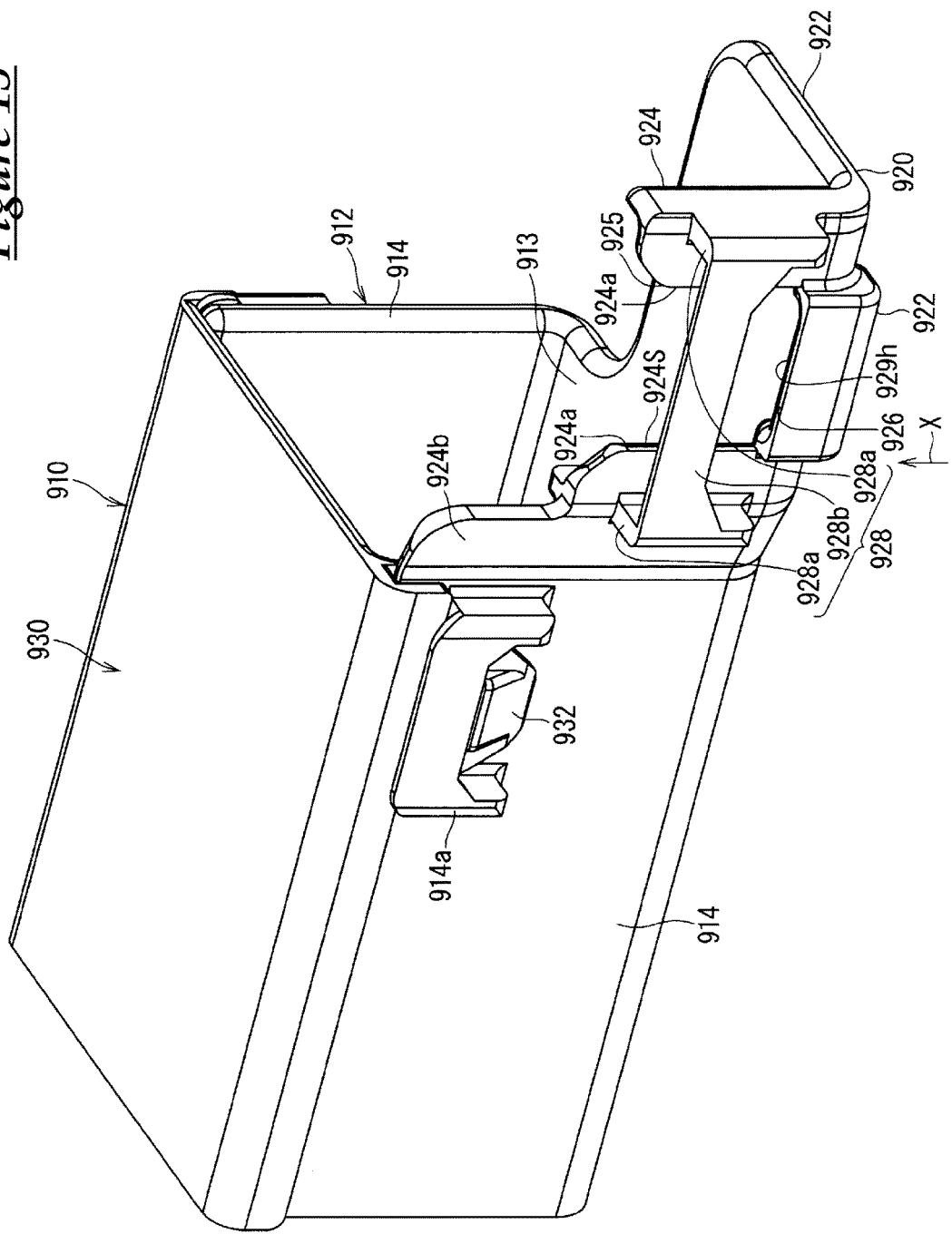
FIG. 15 is a perspective view of a protector according to the second embodiment.
Figure 16:
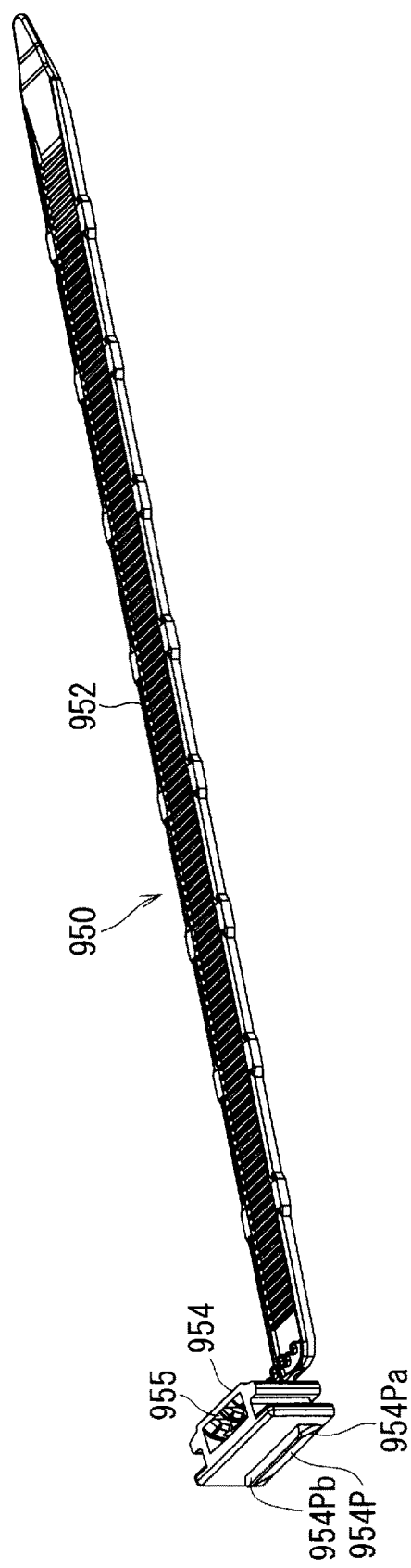
FIG. 16 is a perspective view of an attachment member according to the second embodiment.
Figure 17:
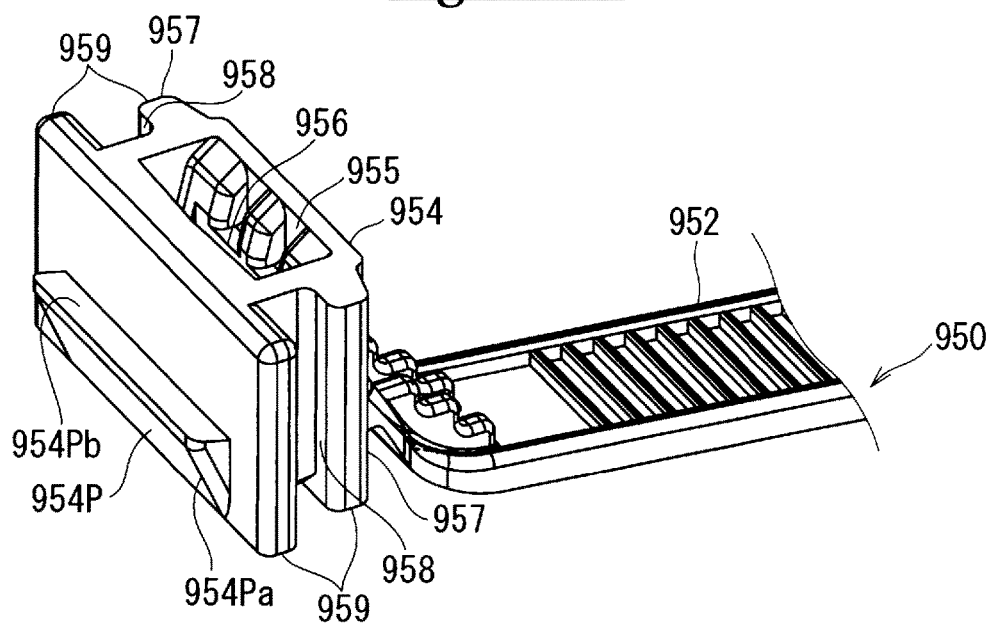
FIG. 17 is a partially enlarged view of the attachment member according to the second embodiment.
Figure 18:
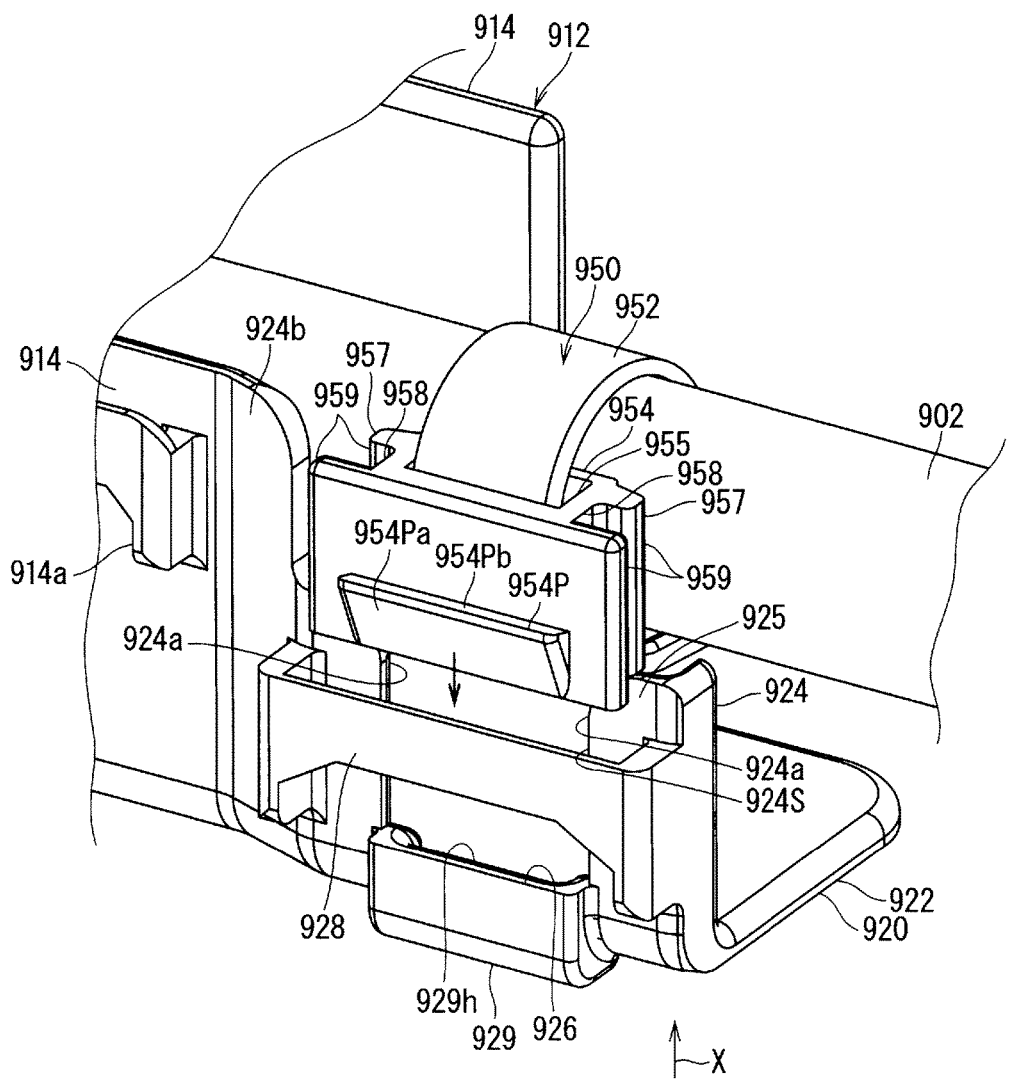
FIG. 18 is a perspective view showing that the attachment member is in the process of being attached to the protector.

The following describes a protector-equipped wire harness 900 according to a second embodiment. FIG. 14 is a perspective view of the protector-equipped wire harness 900, FIG. 15 is a perspective view of a protector 910, FIG. 16 is a perspective view of an attachment member 950, FIG. 17 is an enlarge view corresponding to FIG. 16, and FIG. 18 is a perspective view showing that the attachment member 950 is in the process of being attached to the protector 910.

The protector-equipped wire harness 900 includes an electrical wire 902, the protector 910, and the attachment member 950.

The electrical wire 902 is a member similar to the electrical wire 9 described in the first embodiment above. Also in this example, the electrical wire 902 is provided as a plurality of electrical wires 902 that are tied together.

The attachment member 950 includes a band 952 that can be wound around the electrical wire 902; and a band lock portion 954 that keeps the band 952 in a state of being wound around the electrical wire 902. The attachment member 950 is a member that is made of resin, for example.

The configuration of the band 952 is the same as the configuration of the above-described band 81.

The band lock portion 954 is provided with a through hole 955 that allows the band 952 to pass therethrough. A lock claw 956 that can be locked to a lock recess of the band 952 is formed in the through hole 955 of the band lock portion 954. The configuration for keeping a state where the band lock portion 954 is locked to the band 952 and the band 952 is wound around the electrical wire 902 is the same as the configuration described in the first embodiment above. In this example, the band 952 is wound around the electrical wire 902, and the band 952 is inserted into the through hole 955 of the band lock portion 954 from an end of the band 952, the end being opposite to the proximal end. Then, the lock claw 956 of the band lock portion 954 is selectively locked to the plurality of lock recesses of the band 952, and thus the band 952 is kept in a state of being wound around the electrical wire 902.

Also, as in the first embodiment above, the band 952 is kept in a state of being wound around the electrical wire 902 such that the band 952 penetrates through the band lock portion 954 and a portion of the band 952 protrudes from the band lock portion 954. That is, the band 952 is kept in a state of being wound around the electrical wire 902 such that a portion of the band 952 protrudes from the through hole 955 toward the other surface of the band lock portion 954. If the portion of the band 952 protruding from the through hole 955 is relatively long, for example, the portion of the band 952 protruding from the through hole 955 is to be partially removed. In this way, the band 952 is configured such that a portion thereof protrudes from the through hole 955, and thus the band 952 wound around the electrical wire 902 is less likely to come loose from the band lock portion 954.

Also, the band lock portion 954 includes slidable portions 957 that are supported by a slide supporting portion 925 of the protector 910, which will be described later, so as to be slidable in the first direction X. In this example, each slidable portion 957 includes a pair of slidable side walls 959 that defines a recessed groove 958 that has a recessed shape. In the protector-equipped wire harness 900, the recessed grooves 958 penetrate through the band lock portion 954 in the first direction X.

In the present embodiment, unlike in the above-described first embodiment, one of the pair of slidable side walls 959 on both sides of a recessed groove 958 has a plate-like shape that has a constant thickness, and the other is formed such that a base end-side portion thereof is thicker than a leading end-side portion thereof. As a matter of course, as in the above-described first embodiment, at least one of the pair of slidable side walls on both sides of a recessed groove may be formed such that a base end-side portion thereof is thinner than a leading end-side portion thereof.

The recessed grooves 958 are each provided on either one side of the through hole 955. Therefore, in this example, the slidable portions 957 include two pairs of slidable side walls 959, each pair being provided on either one side of the through hole 955. The respective openings of the two recessed grooves 958 provided on both sides of the through hole 955 face opposite directions. This is because a pair of edge portions 924a, which will be described later, are to be passed through the two recessed grooves 958 of the slidable portion 957.

Also, the band lock portion 954 is provided with a lock protrusion 954P that is locked to a coupling portion 928, which will be described later, from a side to prevent the slidable portions 957 from coming loose from the slide supporting portion 925 in a state where the band lock portion 954 is in contact with a receiver 926, which will be described later.

More specifically, the lock protrusion 954P is provided on a surface of the band lock portion 954, the surface being opposite to the surface on the side of which the electrical wire 902 is disposed. The lock protrusion 954P is formed such that the height thereof gradually decreases in a direction in which the slidable portions 957 is inserted (the first direction X). When the slidable portions 957 of the band lock portion 954 are moved to slide in the first direction X relative to the slide supporting portion 925, a guide inclined surface 954Pa of the lock protrusion 954P comes into contact with the coupling portion 928, which will be described later, so as to elastically deform the coupling portion 928 outward. When the slidable portions 957 of the band lock portion 954 is moved to slide in the first direction X relative to the slide supporting portion 925 and the lock protrusion 954P moves past the coupling portion 928, the band lock portion 954 comes into contact with the receiver 926, and an abutting surface 954Pb of the lock protrusion 954P, the abutting surface 954Pb being opposite to a surface that is located in the first direction X, and being orthogonal to the first direction X, abuts against the coupling portion 928.

The protector 910 is a member that covers at least a portion of the outer circumferential surface of the electrical wire 902 to protect the electrical wire 902. The protector 910 is a member that is made of resin, for example. In this example, the protector 910 has a shape that can protect a straight section of the electrical wire 902. However, the protector 910 may have a shape that can protect a curved section of the electrical wire 902, or a shape that can protect both the curved section and the straight section of the electrical wire 902, for example.

In the present embodiment, the protector 910 includes a protector body 912 and an extension fixing portion 920.

The protector body 912 includes a bottom 913 and a pair of side walls 914 that protrude from the bottom 913.

The extension fixing portion 920 is formed so as to extend outward from one end portion of the protector body 912, and includes a bottom extension portion 922 and a side wall extension portion 924 that protrudes from one side portion of the bottom extension portion 922. The bottom extension portion 922 is a portion that extends from one end portion of the above-described bottom 913, and the side wall extension portion 924 is a portion that extends from one end portion of one of the pair of side walls 914. Therefore, when the protector 910 is taken as a whole, the bottom extension portion 922 can be seen as a portion of the bottom of the protector 910, and the side wall extension portion 924 can be seen as a portion of one of the pair of side walls of the protector 910. Note that a portion of the side wall extension portion 924, on which the slide supporting portion 925 is provided, protrudes further outward than one of the side walls 914, with an inclined side wall 924b being interposed therebetween.

The protector 910 also includes a lid 930. Second fixing portions 932, which have the same configurations as the above-described second fixing portions 42, are provided on both sides of the lid 930 so as to protrude, and first fixing portions 914a, which have the same configuration as the above-described first fixing portions 321, are provided on the outer surfaces of the pair of side walls 914. The second fixing portions 932 are inserted into and fixed to the first fixing portions 914a when the lid 930 is in a closed state, and thus the lid 930 is kept in the closed state. The lid 930 may be omitted.

It is not essential that the protector 910 has the above-described shape. For example, the protector 910 may have a flat plate shape overall, or a shape in which a side wall stands upright on only one side portion of the bottom. If the protector includes a plate-shaped portion, the slide supporting portion may be formed on the plate-shaped portion.

The above-described side wall extension portion 924 is a plate-shaped portion, and the slide supporting portion 925 is formed so as to extend inward (toward the bottom extension portion 922) in the first direction X from one edge portion of the side wall extension portion 924 (the edge portion that is opposite to the edge portion that is continuous with the bottom extension portion 922). Also, the receiver 926 is formed on the far side in the first direction X (the bottom extension portion 922 side) relative to the slide supporting portion 925. In the present embodiment, the protector 910 further includes the coupling portion 928 and a cover 929. The slide supporting portion may be provided on either one or both of the pair of side walls 914 of the protector body 912.

More specifically, the side wall extension portion 924 is provided with a slit 924S that extends in the first direction X from an edge portion of the side wall extension portion 924. The slit 924S is provided in the range from an edge portion of the side wall extension portion 924 to a position immediately above the bottom extension portion 922. The slide supporting portion 925 includes at least one of the pair of edge portions 924a that are located opposite to each other with respect to the slit 924S formed in the side wall extension portion 924. In this example, the slide supporting portion 925 includes both of the pair of edge portions 924a.

The following describes a relationship between the slidable portions 957 and the slide supporting portion 925. Each of the recessed grooves 958 of the slidable portions 957 of the band lock portion 954 is recessed so as to allow one of the pair of edge portions 924a of the slide supporting portion 925 to pass therethrough. For example, the distance between the pair of slidable side walls 959 on both sides of each recessed groove 958 may be set to a value that is equal to, or larger (slightly larger) than the thickness of the edge portions 924a. Note that grooves that extend in the first direction X may be formed on both sides of the slit, and both edge portions of the band lock portion may be inserted into the grooves so as to be slidable. Such a configuration is also applicable to the first embodiment.

In the present embodiment, the band lock portion 954 is moved to slide along the slit 924S in the first direction X toward the bottom extension portion 922 in a state where the pair of edge portions 924a of the slide supporting portion 925 are respectively passed through the two recessed grooves 958 of the band lock portion 954, and thus the slidable portions 957 are supported by the slide supporting portion 925 so as to be slidable.

The receiver 926 is provided on the bottom extension portion 922 side relative to the slide supporting portion 925. In this example, the receiver 926 is provided on the cover 929. The receiver 926 is configured to be able to come into contact with the band lock portion 954 including the slidable portions 957 that are supported by the slide supporting portion 925 so as to be slidable. In the protector-equipped wire harness 900, the protector 910 and the attachment member 950 are fixed to each other in a state where the band lock portion 954 of the attachment member 950 is in contact with the receiver 926.

Also, in this example, the cover 929 is provided for a bottom side portion of the slit 924S.

The cover 929 is a portion that covers at least a portion around an end portion of the band 952 that protrudes toward the bottom extension portion 922 in the first direction X. That is, the cover 929 covers at least a portion of an end portion of the band 952 in a state where the end portion of the band 952 protrudes in the first direction X relative to the band lock portion 954. In this example, a band insertion through hole 929h that is surrounded by the cover 929 and penetrates through the bottom extension portion 922 in the first direction X is provided on a bottom extension portion 922-side extension of the slit 924S.

In this example, as with the cover 37 in the first embodiment, the cover 929 includes a portion that covers an end portion of the band 952 from the outside and a portion that covers the end portion of the band 952 from both lateral sides. In the present embodiment, a portion of the cover 929, the portion being located on the opposite side in the direction in which the slidable portions 957 are moved to be slide and inserted, constitutes the receiver 926. Therefore, in this example, a surface of the band lock portion 954 that is moved in a direction from an edge portion of the side wall extension portion 924 toward the bottom extension portion 922, the surface facing the bottom extension portion 922, comes into contact with the receiver 926 of the cover 929, and thus the band lock portion 954 is restricted from moving toward the bottom extension portion 922 in the first direction X. Then, in such a state, a portion of the band 952, which protrudes from the band lock portion 954, is surrounded by the cover 929. Thus, the end portion of the band 952 is prevented from coming into contact with members around the protector 910.

Note that, in another example, the cover may include only a portion that covers an end portion of the band from the outside, or only a portion that covers the end portion of the band from a lateral side.

Also, the coupling portion 928 is provided so as to couple the pair of edge portions 924a, which are located opposite to each other with respect to the above-described slit 924S, to each other. The coupling portion 928 couples the pair of edge portions 924a to each other at a position that is away from the trajectories of the slidable portions 957 sliding on the slide supporting portion 925, specifically at a position that is away from the trajectory of the band lock portion 954 that includes the slidable portions 957 in this example. More specifically, the coupling portion 928 includes a pair of side protrusions 928a that protrude from the pair of edge portions 924a to the outside of the side wall extension portion 924, and an intermediate coupling portion 928b that couples the pair of side protrusions 928a at a position that is at a distance from the outer surface of the side wall extension portion 924. The recessed grooves 958 of the slidable portions 957 on both sides of the band lock portion 954 move along the edge portions 924a, inside the pair of side protrusions 928a, and the entire band lock portion 954 moves in the first direction X, inside the intermediate coupling portion 928b.

The coupling portion 928 is located closer to the opening of the slit 924S than to the bottom of the slit 924S, and prevents the slit 924S from opening.

In a state where the band lock portion 954 is in contact with the receiver 926, the coupling portion 928 is located at a position that is outside the band lock portion 954 and is on the opposite side relative to the lock protrusion 954P in the direction in which the band lock portion 954 is inserted. In a state where the band lock portion 954 is in contact with the receiver 926, the abutting surface 954Pb of the lock protrusion 954P of the band lock portion 954 is locked to and retains the coupling portion 928.

Note that the same retaining protrusions 36 as in the above-described first embodiment may be provided in the present embodiment.

The above-described protector-equipped wire harness 900 can be obtained through procedures that are the same as those described in the first embodiment above.

That is, first, the band 952 of the attachment member 950 is wound around the electrical wire 902, and a leading end portion of the band 952 is passed through the through hole 955 of the band lock portion 954. Thus, the band 952 is kept in the state of being wound. When performing an operation to wind the attachment member 950 around the electrical wire 902, it is possible to use a common jig board for a wire harness instead of a jig board for a protector. Therefore, it is possible to perform, for example, an operation to remount the wire harness on a jig board for a protector. Thereafter, the pair of edge portions 924a of the slide supporting portion 925 are passed through the recessed grooves 958 of the band lock portion 954 on both sides, and thus the slidable portions 957 of the band lock portion 954 are supported so as to be slidable in the first direction X.

Then, the band lock portion 954 is moved to slide in the first direction X toward the bottom extension portion 922 so that the band lock portion 954 comes into contact with the receiver 926. While being moved, the guide inclined surface 954Pa of the lock protrusion 954P comes into contact with the coupling portion 928, and elastically deforms the coupling portion 928 outward. Upon the lock protrusion 954P being moved past the coupling portion 928, the coupling portion 928 elastically returns to its original shape, and the lock protrusion 954P is locked to and retains the coupling portion 928. In this state, in the first direction X, the band lock portion 954 on the bottom extension portion 922 side comes into contact with the receiver 926 and is restricted from moving in this direction, and the lock protrusion 954P on the opposite side comes into contact with the coupling portion 928 and is restricted from moving in this direction. Thus, the band lock portion 954 is fixed to the slide supporting portion 925.

In this state, the electrical wire 902 is housed in the protector body 912, the lid 930 is closed, and the first fixing portions 914a and the second fixing portions 932 are fixed to each other.

Effects

According to the present embodiment, slidable portions 957 of the attachment member 950 are moved relative to the slide supporting portion 925 to slide in the first direction so that the band lock portion 954 comes into contact with the receiver 926, and the protector 910 and the attachment member 950 are fixed to each other in such a state. In this case, there is no need to use a conventional clamp. Therefore, it is possible to prevent a portion of the protector to which the electrical wire is fixed from protruding outward from the outer surface of the protector by a large length.

Also, the present embodiment includes the cover 929 that covers at least a portion around end portion of the band lock portion 954. Therefore, it is possible to prevent the end portion of the band 952 from coming into contact with members around the protector-equipped wire harness 900.

Also, in the present embodiment, a portion of the side wall extension portion 924, on which the slide supporting portion 925 is provided, protrudes further outward than one of the side walls 914, with an inclined side wall 924b being interposed therebetween. In this case, it is possible to reduce the width of the portions other than the portion of the protector 910 on which the slide supporting portion 925 is provided, and it is possible to reduce the space required for the protector-equipped wire harness 900.

Also, in the present embodiment, the slide supporting portion 925 includes at least one of the pair of edge portions 924a that are located opposite to each other with respect to the slit 924S that extends in the first direction X, and the slidable portions 957 include the recessed grooves 958 that are recessed so as to allow at least one of the pair of edge portions 924a to pass therethrough. With this configuration, it is possible to fix the protector 910 and the attachment member 950 to each other using the slide supporting portion 925 and the slidable portions 957, which have a simple configuration.

Also, in the present embodiment, the pair of edge portions 924a on both sides of the slit 924S are coupled to each other by the coupling portion 928. Therefore, the pair of edge portions 924a are less likely to move away from each other, and the edge portions 924a are less likely to be released from the configuration in which the edge portions 924a are fitted to the recessed grooves 958. Thus, it is possible to more firmly fix the attachment member 950 to the protector 910.

In addition, the lock protrusion 954P is locked to and retains the coupling portion 928 in a state where the band lock portion 954 is in contact with the receiver 926. Therefore, it is possible to more reliably prevent the attachment member 950 from coming loose from the protector 910 in the first direction X. In particular, due to the configuration in which the slit 924S is prevented by the coupling portion 928 from opening out, and the lock protrusion 954P is locked to and retains the coupling portion 928, it is possible to more firmly fix the attachment member and the protector, and it is possible to employ, for example, a configuration in which the attachment member is pressed and held by the lid of the protector. Therefore, the present embodiment is suitable for a protector that does not have a lid.

Modifications

In each embodiment, the lid may be coupled to the protector body so as to be able to open and close, using a hinge.

Also, in each embodiment, the slide supporting portion may include only one of the pair of edge portions that are located opposite to each other with respect to the slit.

In each embodiment, the cover may include, instead of the band insertion through hole, a recess that does not penetrate in the first direction and in which the distal end of the band can be housed.

In the first modification, the configuration of the slidable portion and the configuration of the slide supporting portion may be interchanged. For example, the slidable portion may have a protruding portion, and the slide supporting portion may have a recessed groove that allows the protruding slidable portion to pass therethrough.

Also, in the second embodiment, the contact portion and the gripping portion described in the first embodiment may be provided.

Note that the configurations described in the embodiments and modifications above may be combined with each other as appropriate, unless they contradict each other.

Although the present design has been described above in detail, the descriptions above are examples in all aspects, and the present invention is not limited to the descriptions. It is understood that innumerable modifications that are not illustrated can be envisaged without departing from the scope of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 2, 2B, 910: Protector
3, 3A, 3B, 912: Protector Body
4, 4B, 4C: Lid
8, 8A, 950: Attachment Member
9, 902: Electrical Wire
30: Groove
31, 913: Bottom
32, 914: Side Wall
33, 33A, 925: Slide Supporting Portion
34, 34B, 926: Receiver
35, 924a: Edge Portion
36: Retaining Protrusion
37, 37B, 929: Cover
39, 924S: Slit
44, 44C: Contact Portion
45, 46: Protrusion
81, 952: Band
82, 82A, 954: Band Lock Portion
88, 88A, 957: Slidable Portion
100, 100A, 100B, 900: Protector-equipped Wire Harness
320: One Side Wall
441: Groove-shaped Portion
881, 881A, 958: Recessed Groove
882, 882A, 959: Slidable Side Wall
920: Extension Fixing Portion
922: Bottom Extension Portion
924: Side Wall Extension Portion
924b: Inclined Side Wall 928: Coupling Portion
954P: Lock Protrusion
X: First Direction

The invention claimed is:

1. A protector-equipped wire harness comprising,
an electrical wire;
a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and
an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire,
wherein the protector and the attachment member are fixed to each other in a state where the band lock portion of the attachment member is in contact with the receiver, and
the protector includes a retaining protrusion that is locked to the band lock portion from a side to prevent the slidable portion from coming loose from the slide supporting portion in a state where the band lock portion is in contact with the receiver.

2. The protector-equipped wire harness according to claim 1,
wherein the protector includes a bottom and a pair of side walls that protrude from the bottom, at least one of the pair of side walls serves as the plate-shaped portion on which the slide supporting portion is provided so as to extend in the first direction from a leading end-side portion of the side wall toward the side wall, and the electrical wire is disposed in a groove that is defined by the bottom and the pair of side walls.

3. The protector-equipped wire harness according to claim 2,
wherein the protector further includes a lid that covers the groove from a side that is opposite to the bottom side with respect to the groove, and
the lid includes a gripping portion that sandwiches the pair of edge portions from an inner surface side and an outer surface side of a side wall.

4. A protector-equipped wire harness comprising:
an electrical wire;
a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and
an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire,
wherein the protector and the attachment member are fixed to each other in a state where the band lock portion of the attachment member is in contact with the receiver,
the slide supporting portion includes at least one of a pair of edge portions that are located opposite to each other with respect to a slit that extends in the first direction,
the slidable portion is supported so as to be slidable in the first direction relative to at least one of the pair of edge portions, and
the protector-equipped wire harness further includes a coupling portion that couples the pair of edge portions, which are located opposite to each other with respect to the slit, to each other at a position that is away from a trajectory of the slidable portion sliding on the slide supporting portion.

5. The protector-equipped wire harness according to claim 4,
wherein the band lock portion is provided with a lock protrusion that is locked to the coupling portion from a side to prevent the slidable portion from coming loose from the slide supporting portion in a state where the band lock portion is in contact with the receiver.

6. A protector-equipped wire harness comprising:
an electrical wire;
a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and
an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire,
wherein the protector and the attachment member are fixed to each other in a state where the band lock portion of the attachment member is in contact with the receiver,
the slide supporting portion includes at least one of a pair of edge portions that are located opposite to each other with respect to a slit that extends in the first direction, and
the slidable portion constitutes a recessed groove that is recessed so as to allow one of the pair of edge portions to pass therethrough, and includes at least one of a pair of slidable side walls that are provided on both sides of the recessed groove.

7. The protector-equipped wire harness according to claim 6,
wherein the pair of slidable side walls of the slidable portion are formed such that base end-side portions of the slidable side walls are thinner than leading end-side portions of the slidable side walls.

8. A protector-equipped wire harness comprising:
an electrical wire;
a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire, wherein the protector and the attachment member are fixed to each other in a state where the band lock portion of the attachment member is in contact with the receiver, and a portion of the plate-shaped portion, on which the slide supporting portion is provided, protrudes more outward compared to portions on both sides of the portion on which the slide supporting portion is provided.

9. A protector-equipped wire harness comprising:
an electrical wire;
a protector that includes a plate-shaped portion, a slide supporting portion that is formed so as to extend inward in a first direction from one edge portion of the plate-shaped portion, and a receiver that is provided on a far side with respect to the slide supporting portion, the protector being provided so as to cover at least a portion of an outer circumferential surface of the electrical wire; and an attachment member that includes a band that can be wound around the electrical wire, and a band lock portion that includes a slidable portion that is supported by the slide supporting portion so as to be slidable in the first direction, the band lock portion keeping the band in a state of being wound around the electrical wire, wherein the protector and the attachment member are fixed to each other in a state where the band lock portion of the attachment member is in contact with the receiver, one end of the band is formed continuous with the band lock portion, the band is kept in a state of being wound around the electrical wire such that the band penetrates through the band lock portion and the other end of the band protrudes from the band lock portion, and the protector includes a cover that covers at least a portion of a portion around the other end of the band such that the other end of the band protrudes in the first direction.

* * * * *